B. T. BURCHARDI, V. E. HANSEN & H. S. MARSH.
CIGAR MACHINE.
APPLICATION FILED JULY 8, 1911.
1,075,189.
Patented Oct. 7, 1913.
12 SHEETS—SHEET 6.
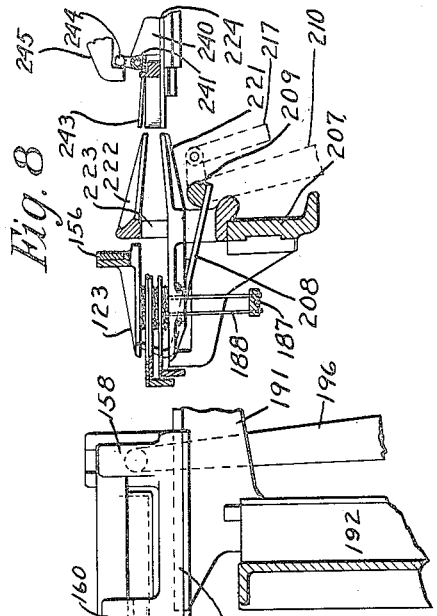
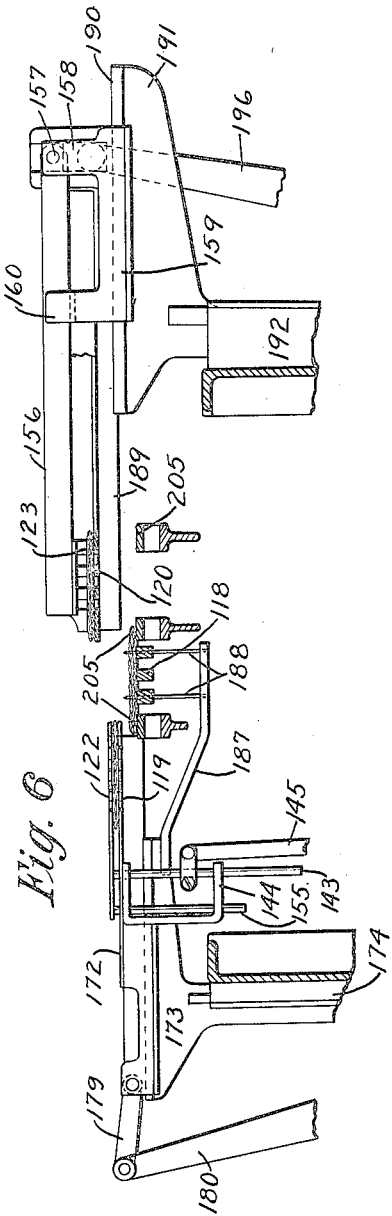
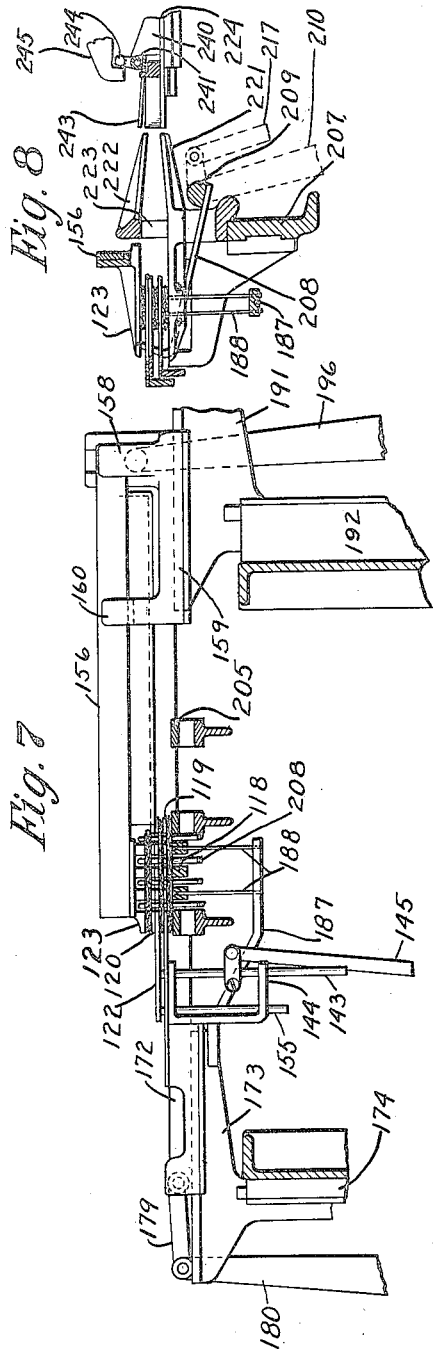
Witnesses:
A. White
P. M. Tildus
Inventors
Bernhard T. Burchardi
Victor E. Hansen
Harry S. Marsh

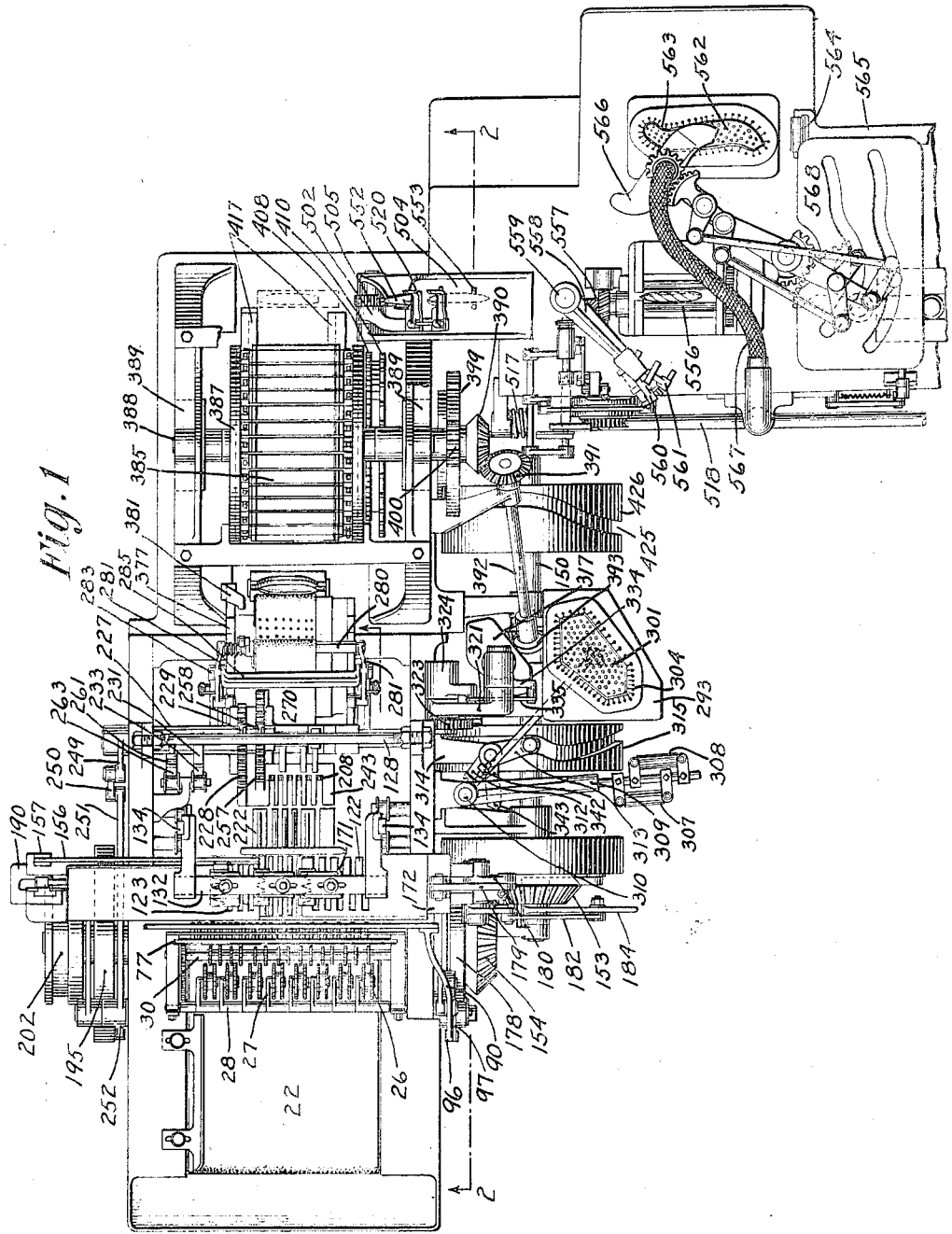

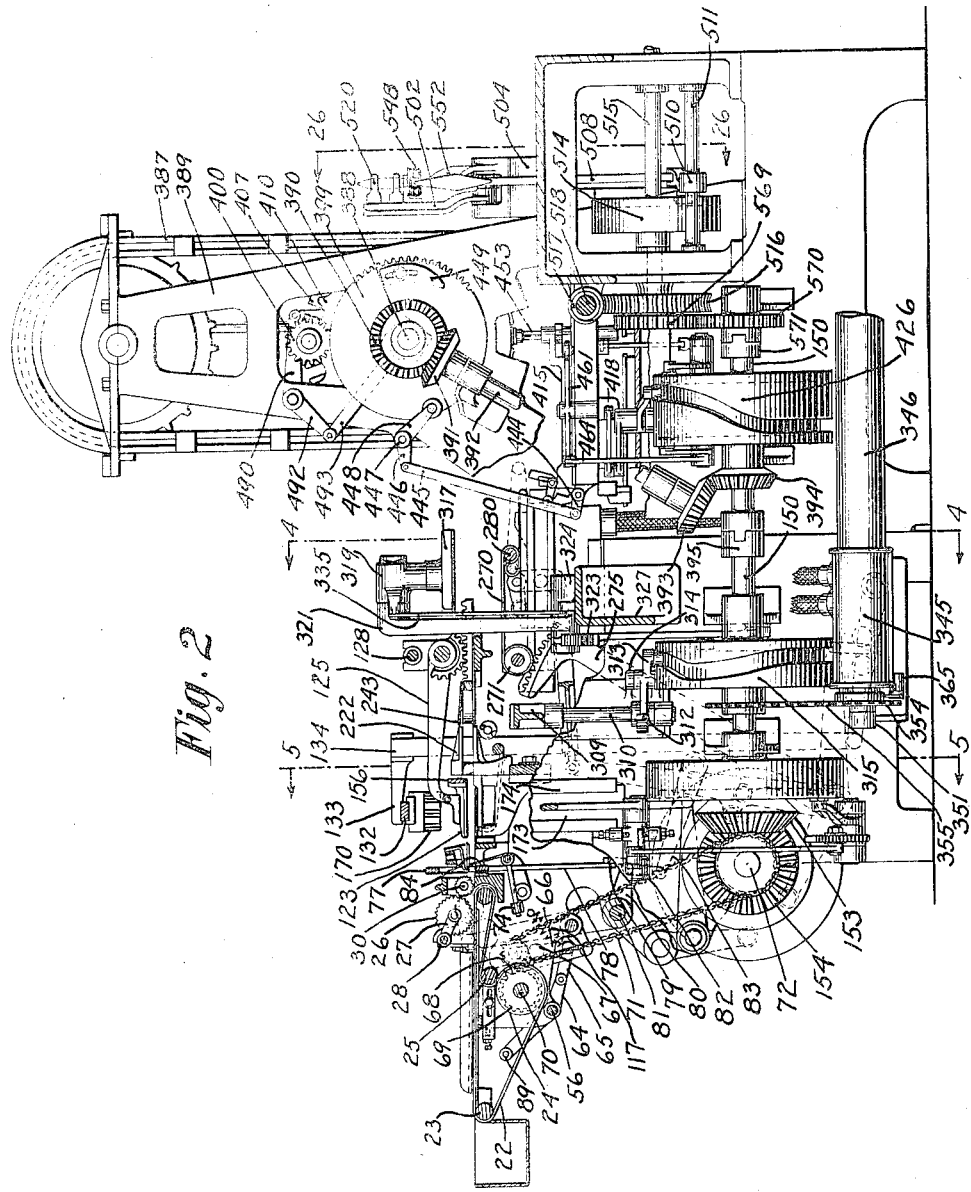

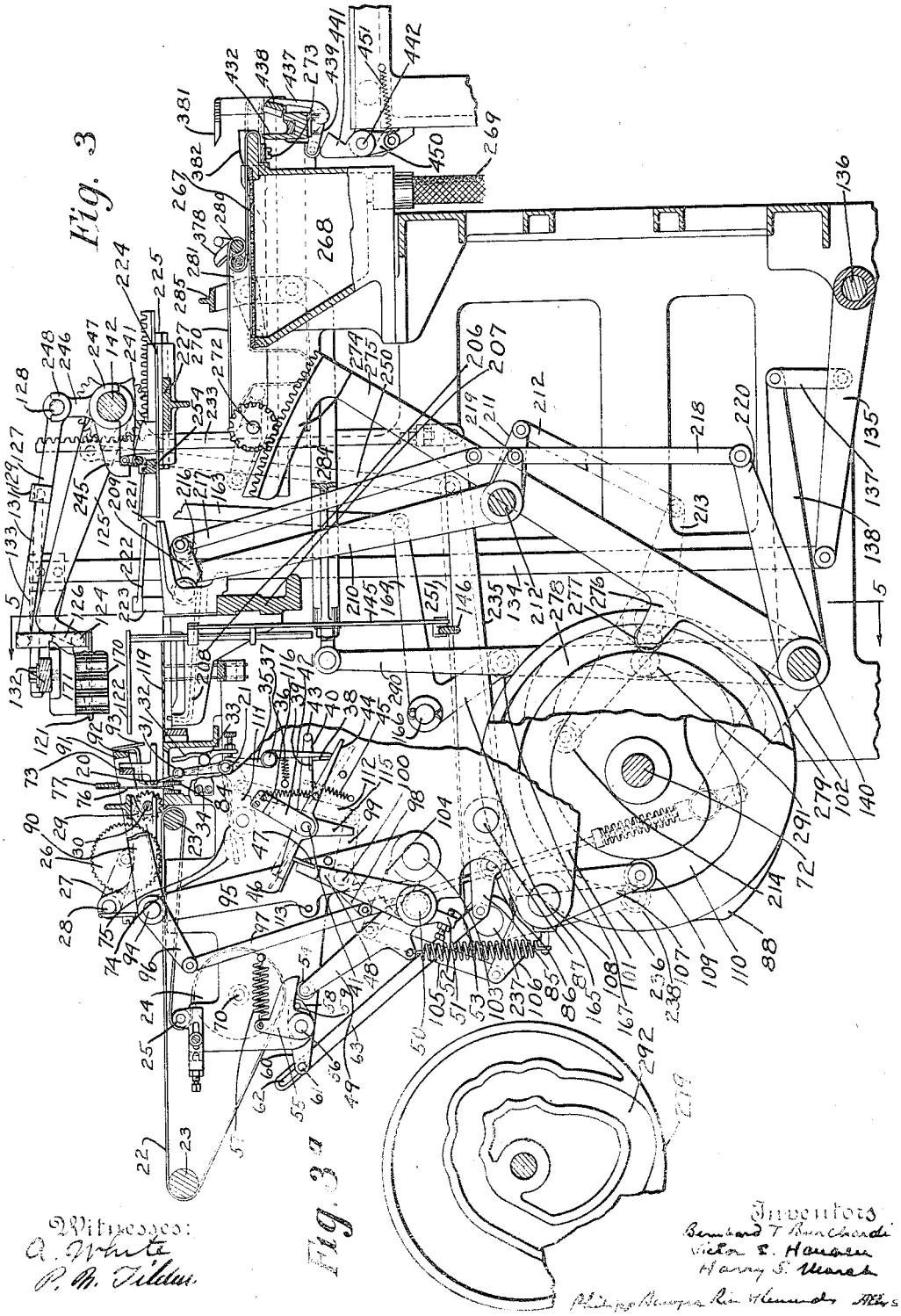

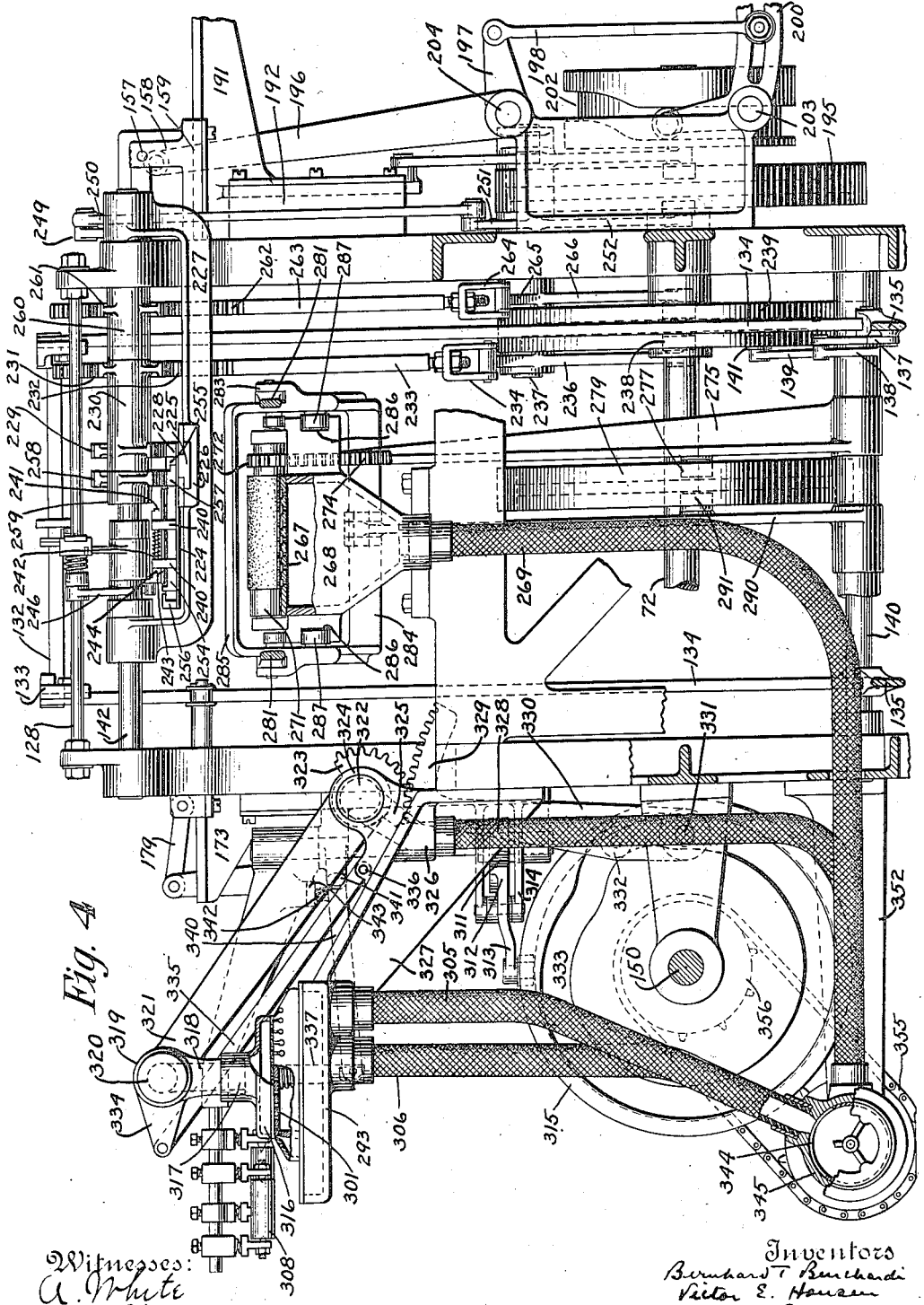

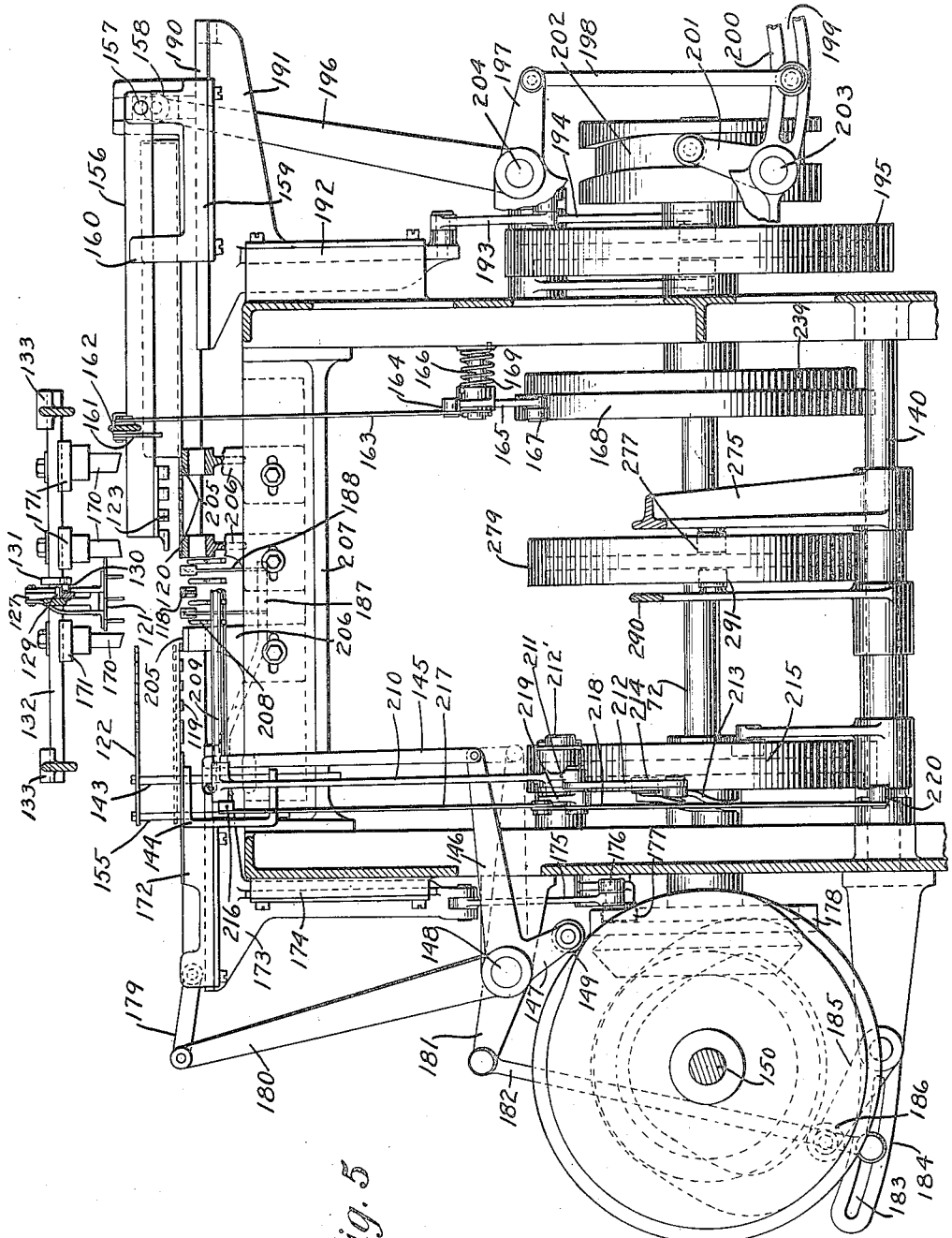

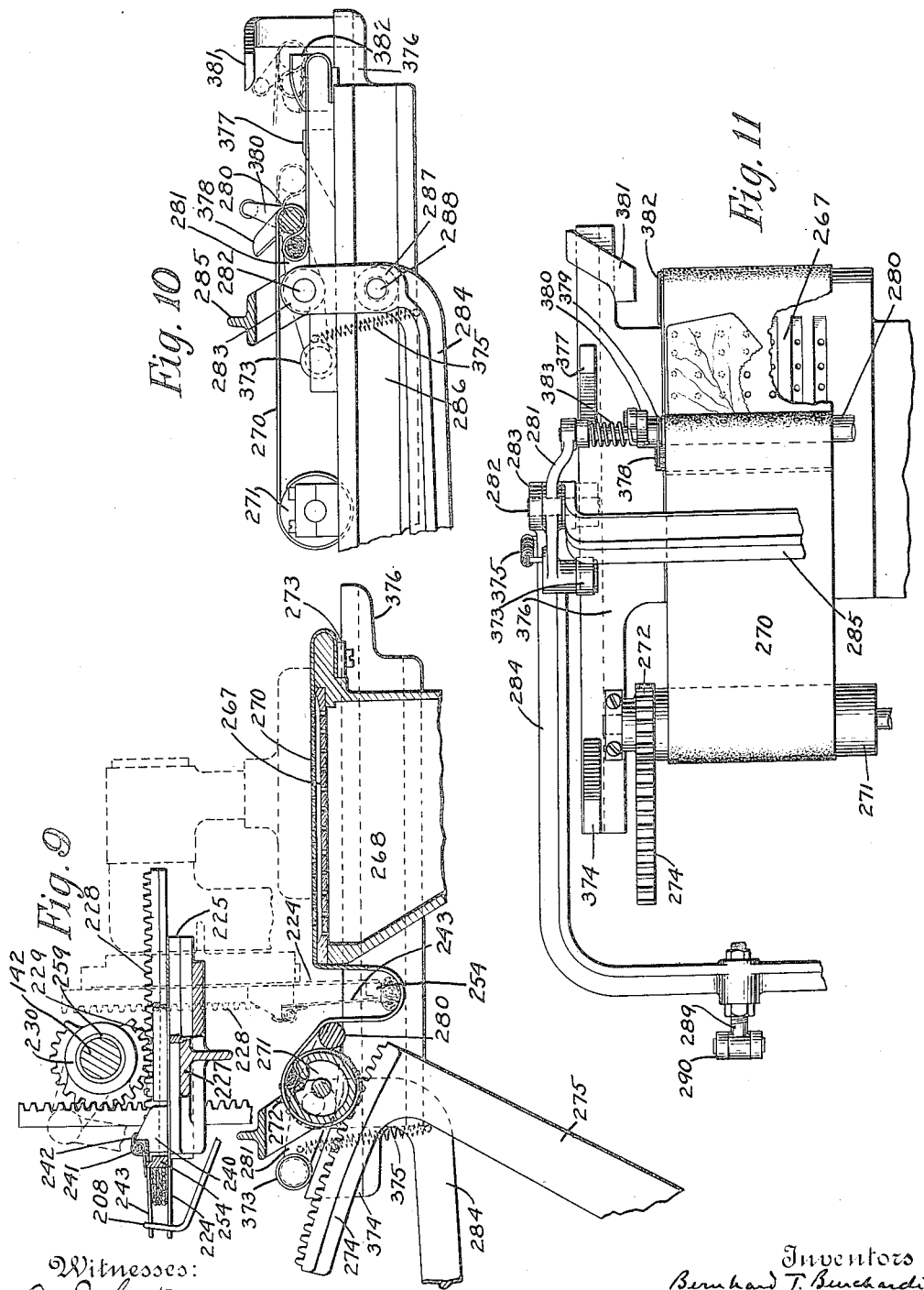

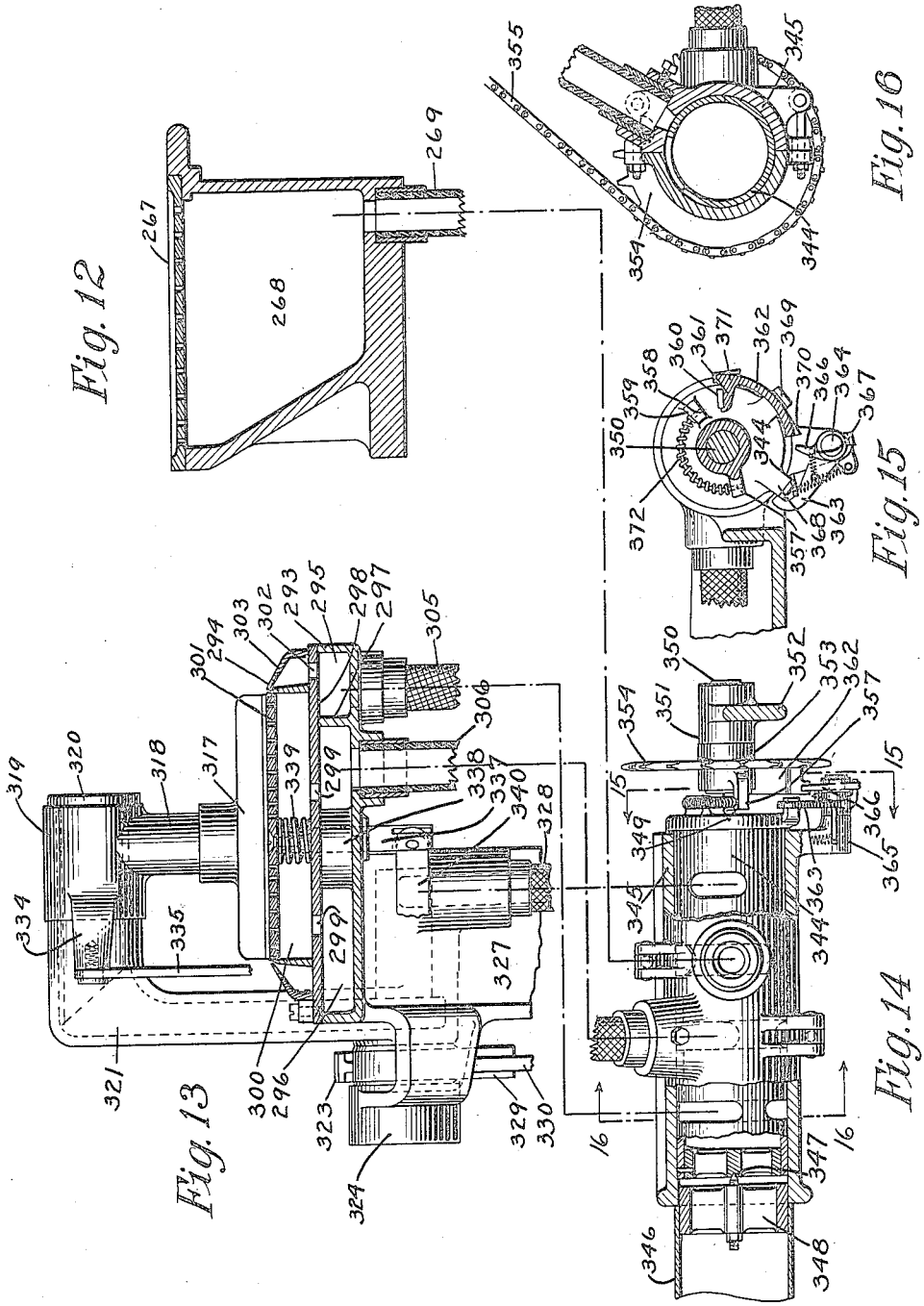

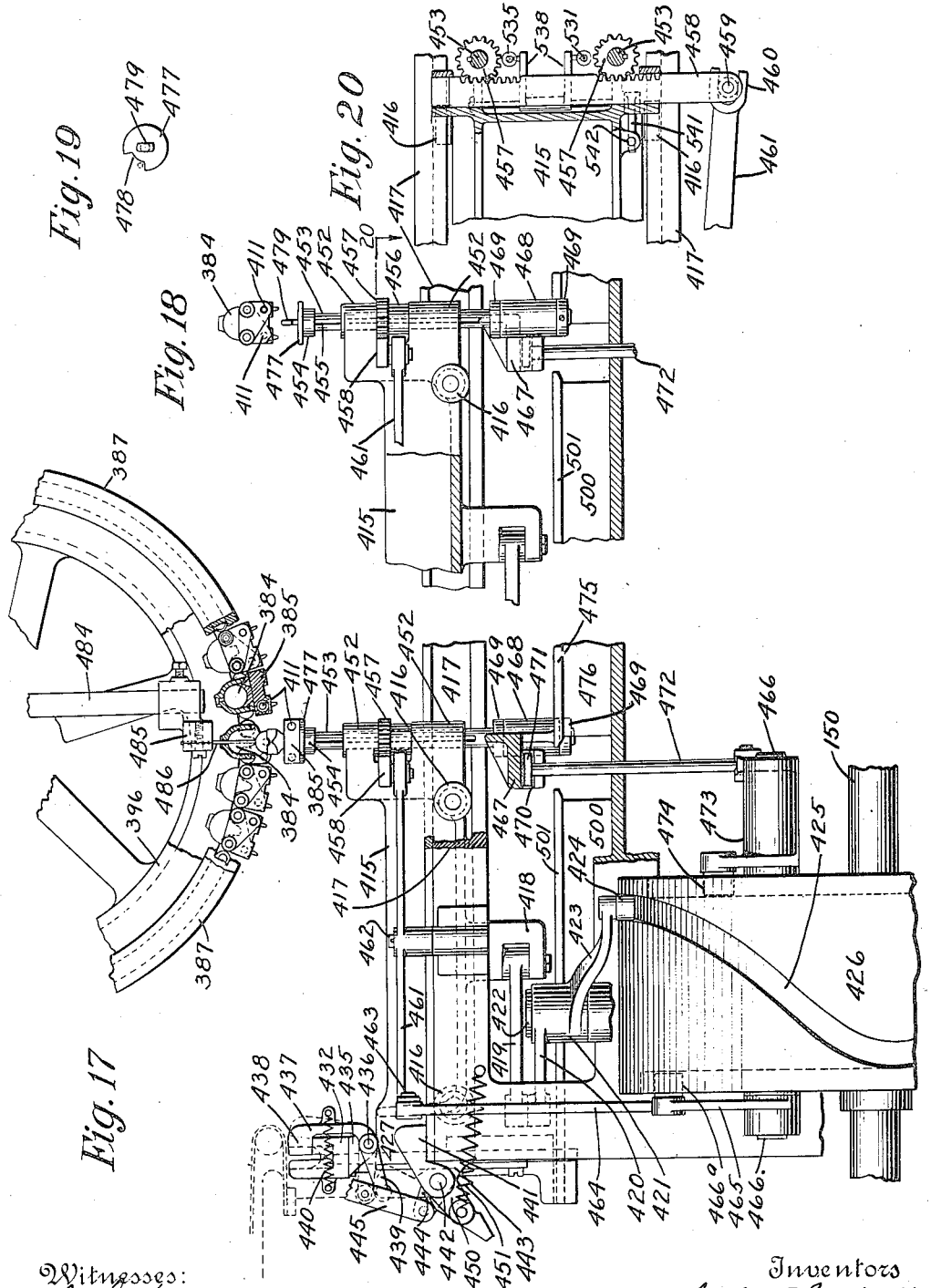

B. T. BURCHARDI, V. E. HANSEN & H. S. MARSH.
CIGAR MACHINE.
APPLICATION FILED JULY 8, 1911.
1,075,189.
Patented Oct. 7, 1913.
12 SHEETS—SHEET 10.
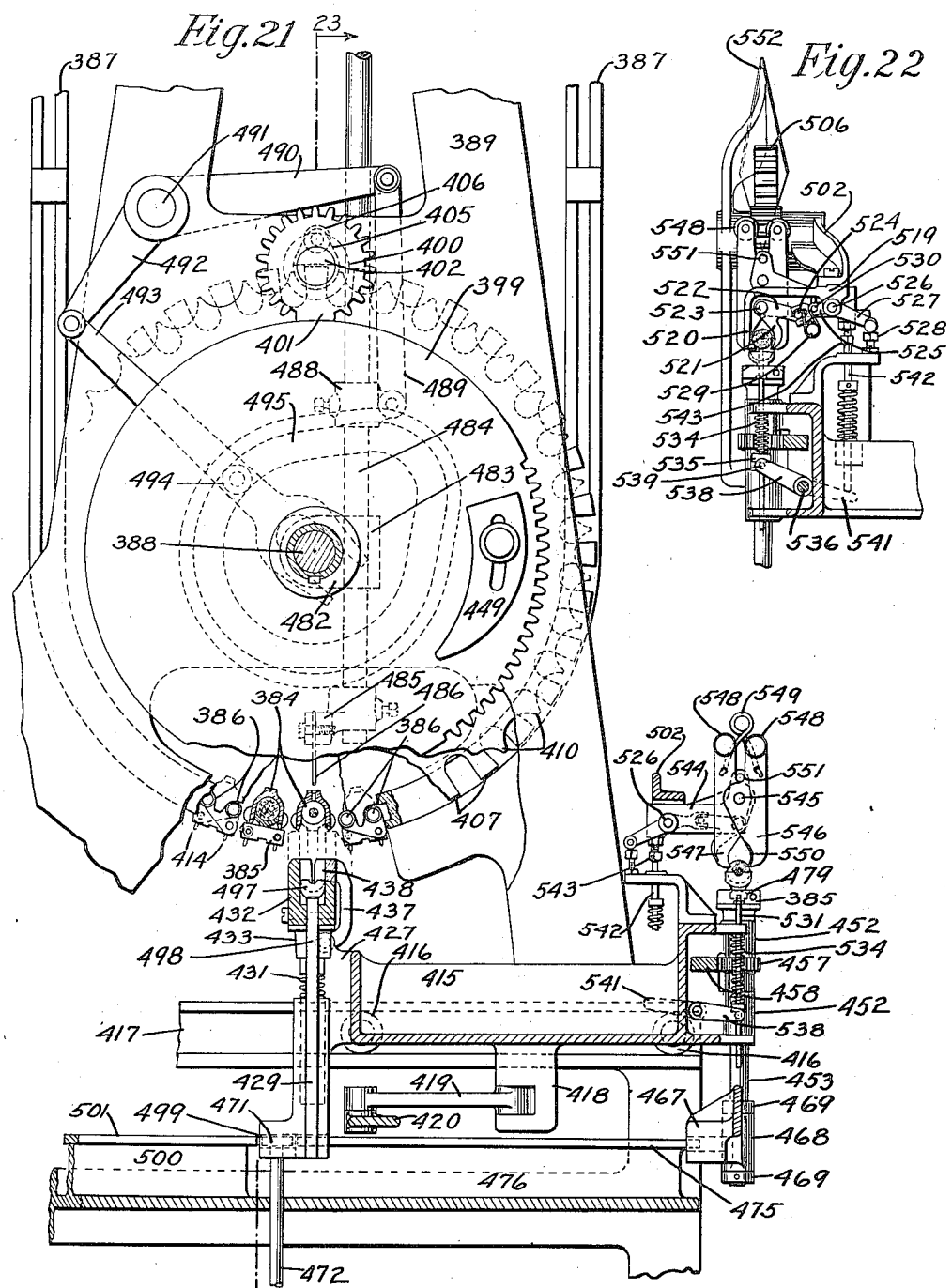

B. T. BURCHARDI, V. E. HANSEN & H. S. MARSH.
CIGAR MACHINE.
APPLICATION FILED JULY 8, 1911.
1,075,189.
Patented Oct. 7, 1913.
12 SHEETS—SHEET 11.
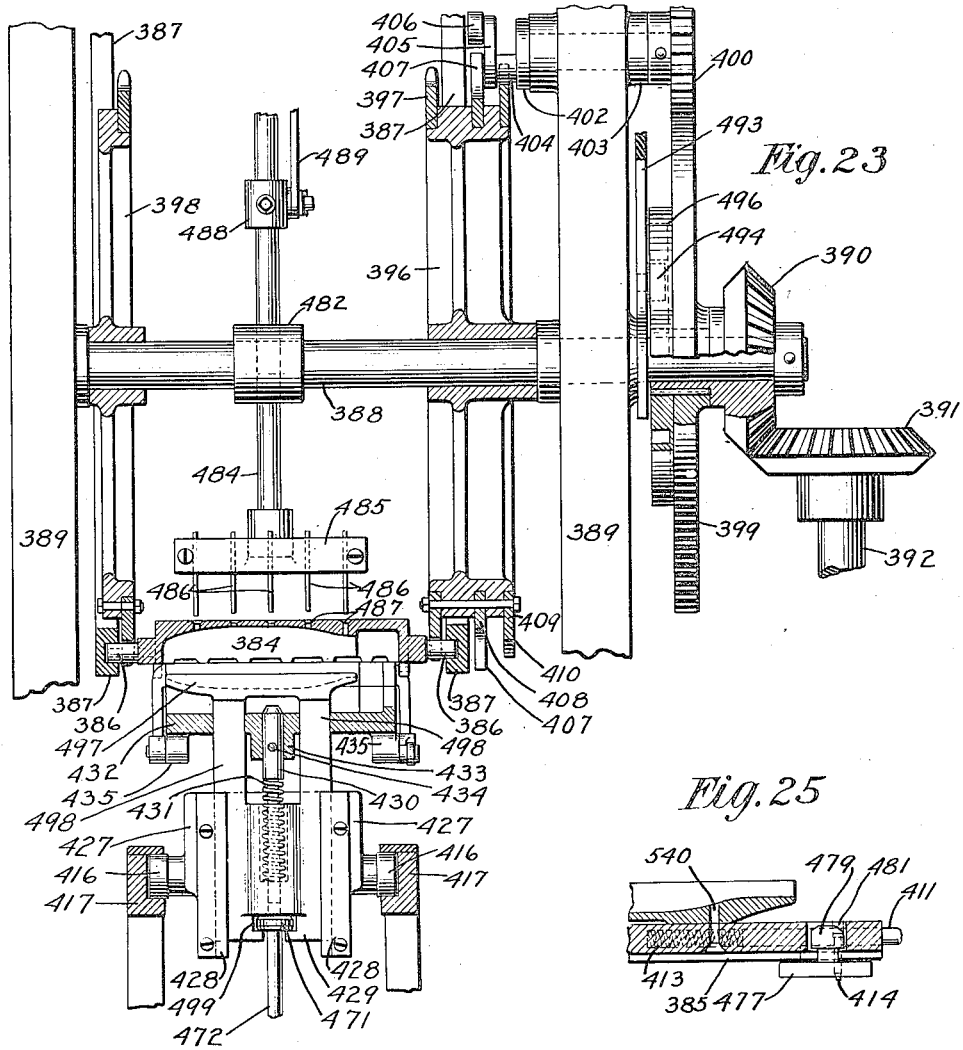
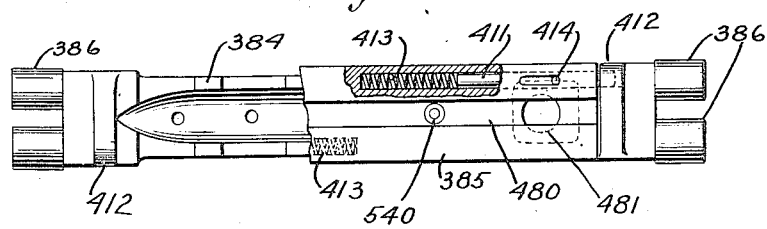

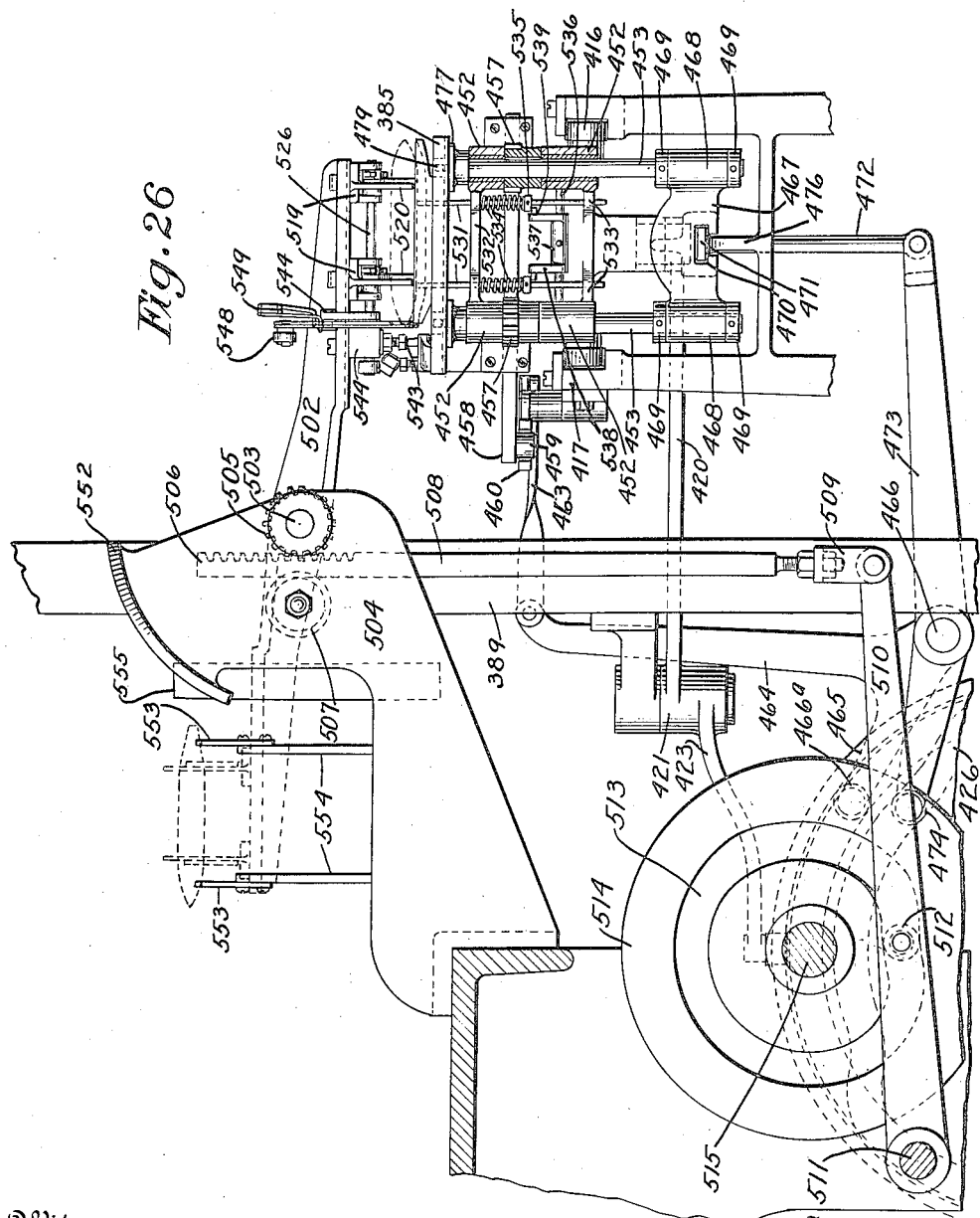

UNITED STATES PATENT OFFICE.

BERNHARD T. BURCHARDI, OF NEW YORK, N. Y., VICTOR E. HANSEN, OF ELIZABETH, NEW JERSEY, AND HARRY S. MARSH, OF NEW YORK, N. Y., ASSIGNORS TO INTERNATIONAL CIGAR MACHINERY COMPANY, OF NEW YORK, N. Y., A CORPORATION OF NEW JERSEY.

CIGAR-MACHINE.

1,075,189.  Specification of Letters Patent.  Patented Oct. 7, 1913.

Application filed July 8, 1911. Serial No. 637,473.

*To all whom it may concern:*

Be it known that we, BERNHARD T. BURCHARDI, a citizen of the United States, and resident of New York, county of Kings, and State of New York, VICTOR E. HANSEN, a citizen of the United States, and resident of Elizabeth, county of Union, and State of New Jersey, and HARRY S. MARSH, a citizen of the United States, and resident of New York, county of Kings, and State of New York, have invented certain new and useful Improvements in Cigar-Machines, fully described and represented in the following specification and the accompanying drawings, forming a part of the same.

This invention relates to improvements in machines for making long filler cigars.

Viewed in its entirety, the main object of the invention is to produce an improved cigar machine by which the various operations incident to the production of long filler cigars may be successively carried out.

Other objects of the invention are to produce improved mechanisms by which the various operations incident to the production of a long filler cigar are carried out.

With the objects above indicated in view, the invention consists in certain constructions, and in certain parts, improvements and combinations as will be hereinafter fully described and then specifically pointed out.

Referring to the accompanying drawings: Figure 1 illustrates in plan view a machine constructed in accordance with the invention, certain parts, however, being omitted in the interest of clearness. Fig. 2 illustrates, in side elevation and partly in section, the filler forming, bunch forming and shaping mechanisms illustrated in Fig. 1. Fig. 3 is an enlarged view, illustrating in side elevation and partly in section the filler forming and bunch forming mechanisms illustrated in Fig. 1. Fig. 3ª is a detail view of one of the cams which may be employed. Fig. 4 is an enlarged sectional view on the line 4—4 of Fig. 2, certain parts being broken away for clearness. Fig. 5 is a section taken generally on the line 5—5 of Fig. 2, though certain parts which would appear in a true section are omitted in order to make the construction clear. Figs. 6, 7 and 8 are detail views illustrating more particularly the construction of the devices shown in Fig. 1 for assembling the filler sub-sections into a filler. Figs. 9, 10 and 11 are detail views illustrating more particularly the devices shown in Fig. 1 for transferring the filler, for rolling it into a bunch and for trimming it. Fig. 12 is a sectional view, on an enlarged scale, of the rolling table illustrated in Fig. 1 showing the suction connection. Fig. 13 is an enlarged view partially in section of the binder cutting die shown in Fig. 1, and some of the parts associated therewith, this view also illustrating the suction connections. Figs. 14, 15 and 16 are detail views illustrating the construction of a suction controlling valve which may be employed; Figs. 15 and 16 being sections taken on the lines 15—15 and 16—16, respectively, of Fig. 14. Fig. 17 is a detail side elevation, partly in section, illustrating a portion of the shaper mechanism of Fig. 1, and the devices for supplying the bunches to and removing them from the shaper mechanism. Fig. 18 is a detail view illustrating the bunch removing mechanism shown in Fig. 17 with the parts in a different position. Figs. 19 and 20 are detail views illustrating more specifically certain features of construction of the bunch removing mechanism. Fig. 21 is a detail view, partly in section, of the shaper mechanism and the bunch supply and removing mechanism illustrated in Fig. 1, this view when compared with Fig. 17 illustrating the parts in a different position than that which they occupy in Fig. 17, the view also showing additional details of construction. Fig. 22 is a detail view illustrating certain details of construction of the bunch transferring mechanism shown in Fig. 21, this mechanism serving to take the bunch from the bunch removing mechanism. Fig. 23 is a section on the line 23—23 of Fig. 21, certain parts being broken away. Fig. 24 is a detail view illustrating one of the bunch molds employed in the shaper, the view being broken out to show the locking mechanism and mold body. Fig. 25 is a detail view of the locking mechanism of Fig. 24. Fig. 26 is an enlarged detail view illustrating the bunch transferring mechanism, of Fig. 1, this mechanism being employed to transfer the bunch from the bunch removing mechanism.

In making long filler cigars, it is important that the bunches which are to be wrapped by the wrapping mechanism shall be of uniform size, shape, and density. If the bunches vary in size or shape the wrapping mechanism will not properly apply the wrapper, that is to say, the wrapper is liable to be either too loose or too tight or too tight in some places and too loose in others. If the bunches vary in density, the completed cigars will not smoke uniformly. In order to produce uniform cigars, the bunches should be uniform, i. e., each bunch should contain the proper amount of filler tobacco. Machines embodying the invention in its entirety will, therefore, include a filler measuring means. While this filler measuring means may be varied, it may include a yielding abutment against which the filler is forwarded by suitable forwarding devices. While the character of this abutment, when employed, may be varied, in the particular construction illustrated it includes a series of yielding measuring fingers 20 (see Fig. 3) mounted on a shaft 21 and arranged along the shaft. The character of the forwarding devices employed may be varied, but as shown, they include a belt 22 running over idle rolls 23 and around a driving drum 24, a belt tightener 25 of usual construction being employed, if desired. A series of star wheels 26 coöperates with the belt 22, these wheels being mounted on arms 27 extending from a shaft 28 located over the belt. The operator selects and carefully lays the filler leaves on the stretch of the belt 22 in front of the star wheels, being careful to arrange them in an even sheet and with the stems parallel to the axes of the star wheels and with the ends of the leaves overlapping. If desired, a second set of star wheels 29 may be employed, these star wheels, as shown, being mounted on a driven shaft 30, so that they assist in positively feeding the tobacco filler forward. As the feeding devices operate, the tobacco is forced against the spring fingers 20 and these fingers are forced backward.

In the best constructions embodying the invention, the construction will be so arranged that the feeding devices are under the control of the measuring abutment so that when a proper amount of filler has been fed forward, the operation of the feeding devices will be stopped. While this may be accomplished in various ways, in the particular construction illustrated, the shaft 21 is provided with an arm 31 which as the fingers yield is rocked backward against a two-armed lever 32 pivoted at 33 on a bracket 34 secured to the machine frame. The lower end of this lever 32 controls a two-armed latch 35 pivoted at 36 to the frame of the machine and held in its operative position by a spring 37. The lower end of the latch 35 is provided with a hook 38 which engages a latch plate 39 mounted on a lever 40 pivoted on a stud 41 in a bracket 42 on the machine frame. This lever 40 is provided with a stud 43 which overlies a tripping lever 44 pivoted on the stud 41. The lever 40 has a pull spring 45 connected to it. The lever 44 is provided with a latch plate 46 which takes over a latch 47 mounted on one of the arms 48 of a two-armed trip lever 48, 49 pivoted at 50, the arm 49 having a pull spring 51 connected to it. The hub of the two-armed lever 48—49 has a projection 52 which carries a stop screw 53. The arm 49 is provided with a roll 54 which underlies a rocker 55 loose on a shaft 56, this rocker having connected thereto an actuating spring 57. The shaft 56 has a short arm 58 connected to it, this arm being provided with a pin 59 which underlies the rocker. The shaft also has an operating arm 60 provided with a pin 61 engaging a slot 62 in a connecting rod 63. The shaft 56 carries one of the arms 64 (see Fig. 2) of a jointed or toggle lever 64, 65, the arm 65 of this lever being connected to a lever 66 (see dotted lines in Fig. 2) pivoted on a stud 67 and provided with a driving pinion 68 which engages a gear 69 on the shaft 70 of the belt driving drum 24. The pinion 68 is driven by a chain 71 which runs around a sprocket wheel, not shown, on a shaft 72, this being one of the main shafts of the machine.

In the operation of the mechanism filler tobacco will be fed forward by the belt and star wheels referred to, the advancing tobacco putting the fingers 20 under strain and gradually forcing them back. A guard or grid 73 may be provided to prevent the filler from rising as its advance is resisted by the fingers. As the fingers are put under stress, they tend to rock the shaft 21, the movement of the shaft, however, being resisted by a weight 74 adjustably mounted on a weight carrying arm 75 extending from the shaft 21. When, however, sufficient strain has been put upon the fingers the shaft rocks against the resistance of the weight and the fingers and shaft move backward together until the arm 31 strikes the two-armed lever 32. As this lever is rocked by the arm 31 it, in turn, rocks the two armed lever 35, forcing the hook 38 from underneath the latch plate 39. When this occurs, the arm 40 is forced down by the spring 45 and its stud 43 strikes the tripping lever 44 disengaging the latch plate 46 from the latch 47 on the two-armed lever 48, 49. This lever is now rocked down by its spring 51, permitting the rocker 55 to be pulled over by its spring 57, this in turn rocking the shaft 46 through the pin 59 on the arm 58. This movement of the shaft 56 operates the jointed lever 64—65, and causes the lever 66 to swing on its pivot, disengaging the driving pinion 68 from the gear 69. This trip mechanism enables a very delicate measurement of the filler to be effected and at the same time renders it possible to employ the heavy springs which positively operate the parts which interrupt the driving of the feed. It will be understood, however, when a tripping mechanism is employed for carrying the invention into effect, that the details of the construction may be varied widely from that which has been described.

After the feeding action is stopped, means should be employed for dividing the measured amount of filler from the mass which is being forwarded under the control of the feeding agencies. In the particular machine shown, this dividing means consists of a knife 76 carried on a cross-bar 77, the ends of this bar having connected to it draw-bars 78. These draw bars are connected by brackets 79 to rock-arms 80 mounted on a shaft 81 extending across the machine. One of the arms 80 is connected by a link 82 to a cam lever 83 (see dotted lines in Fig. 2) operated from a cam, not shown, on the shaft 72. The knife 76 coöperates with the usual slotted cutting block 84. It will be understood that as the knife is cam operated it will be operated once for every revolution of the shaft 72.

It may happen through inattention on the part of the operator, or for other reasons, that sufficient tobacco is not fed forward by the feeding mechanism to spring the fingers to the degree necessary to effect the automatic stopping of the feeding mechanism in the manner described. In order, therefore, to prevent the feeding operation from continuing while the knife is down and the tobacco from banking up against the knife, means may be provided for effecting the stopping of the feeding mechanism as the knife comes into operation. While these means may be varied, in the particular machine shown the link 63 before described is connected to a cam lever 85 provided with a roll 86 and pivoted on a stud 87. The roll 86 is in the path of a cam 88 on the shaft 72, this cam being so located that it strikes the roll 86 just before the knife starts to descend. As the lever 85 is raised by the cam the shaft 56 will be rocked, the jointed lever 64—65 operated, and the driving pinion 68 thrown out of mesh with the gear 69, in case it is not already thrown out by the stopping mechanism before referred to. It may be here remarked that the shaft 56 may also be provided with a handle 89 (see Fig. 2) by which the operator may stop the feeding mechanism, if desired.

After the measured section of long filler has been divided from the mass, it is, in the machine shown, automatically fed forward for further operation. While this may be accomplished in various ways, in the machine shown there is employed a pair of carrier arms 90, one on each side of the machine. these arms being connected at their forward ends by a cross-bar 91 having rearward extending rake-teeth 92 which overlie the top of the section of the filler. It may also carry front holding teeth 93. This construction is efficient because it holds the tobacco firmly and prevents disarrangement of the leaves as they are forwarded. The arms 90 are mounted on studs 94 carried on arms 95. Each of the arms 90 has a rearward extension 96, these extensions being connected by a link 97 to arms 98 of two-armed levers 98—99 pivoted at 100 on the arms 95. The arms 98 are connected by spring rods 101 to arms 102. These arms 102 are operated by a connection not shown from a cam on the shaft 72 before referred to. As this cam comes into operation, the arms 90 will, through the connections described, be swung down and engage the divided filler section. The arms 95 are mounted on a rock-shaft 103 having an operating arm 104 connected by a link 105 to a two-armed lever 106—107 pivoted on a stud 108. The arm 107 is provided with a roller 109 which engages a cam groove 110 in a cam disk on the shaft 72 before referred to. As the cam comes into operation, the arms 95 are swung forward and through the rake teeth referred to feed the tobacco forward.

In the best constructions embodying the invention, the measuring fingers 20 will be swung down out of the way so that the tobacco may not be torn by them as the tobacco is fed forward. While this may be accomplished in various ways, in the construction shown the shaft 21 is carried by arms 111 connected by a link 112 to the arms 99 of the two-armed levers 98—99.

It will be remembered that in the particular machine shown the feeding operation ceases during the cutting operation. As the tobacco begins to be fed forward after cutting, the feeding operation should be resumed and at the same time the mechanism by which it has been interrupted should be reset for subsequent operation. While this may be accomplished in various ways, in the construction illustrated, one of the arms 95 is provided with studs 113, 114. The lever 40 before referred to which carries the latch plate 39 is provided with a depending extension 115 which is in the path of the stud 114. As the arm 95 is swung forward to effect the feeding operation of the teeth 92, the stud 113 strikes the arm 48 of the two-armed lever 48—49 and swings it backward, pushing the latch plate 47 under the latch 46. the lever 44 which carries the latch being held down by a spring 116. At the same time the stud 114 strikes the extension 115 of the lever 40 and rocks this lever up so that the spring 37 pulls the hook 38 on the two-armed latch 35 under the latch plate 39. As the lever 48—49 is swung, the arm 49 raises the rocker plate 55 and this allows a spring 117 which is fast to the pinion carrying lever 66 to swing this lever so as to bring the pinion 68 into mesh with the driving gear 69 on the belt roll shaft 70. This causes the belt to begin its travel and the feeding operation to be resumed.

In the particular machine illustrated, the measured section of tobacco which is fed forward is longer and smaller in cross-section than the bunch which is to be eventually formed, and this measured section is subdivided into sub-sections which are assembled for the formation of the filler. This assembling of the sub-sections to effect the formation of the filler may be carried out by mechanism which differs widely in construction and operation. In the particular machine illustrated, the tobacco is forwarded by the fingers or teeth 92. The tobacco is received from the feeding fingers by three slotted plates (see Figs. 5, 6 and 7) marked 118, 119 and 120, these plates forming holders for the tobacco. Each of these plates has a clamp coöperating with it, marked respectively 121, 122 and 123. The clamps should be of such a character that at the time the tobacco is forwarded, they may be moved out of the way to permit the fingers or teeth 92 to readily deliver the measured section of tobacco to the plates. While the clamps may be operated in various ways, in the construction shown the clamp 121 (see Fig. 3) is pivoted at 124 to a rock-arm 125. This clamp has an upward extension 126 pivoted to a lifter lever 127 which is pivoted on a rod 128 extending across the machine. The lifter lever 127 has a hook 129 (see Fig. 5) which takes over a roll 130 on a lifter arm 131 (see Fig. 3) bolted to a reciprocating cross-head 132. This cross-head is carried on arms 133 fast on vertically reciprocating posts 134 (see Fig. 3) which are connected to levers 135 pivoted on a rod 136 extending across the machine. One of the levers 135 has connected to it a link 137 connected to one of the arms 138 of a bell-crank lever 138—139 pivoted on a rod 140 extending across the machine. The arm 139 carries a cam-roll 141 (see dotted lines in Fig. 4) which coöperates with a cam on the shaft 72 before referred to. As the cross-head 132 reciprocates, the lever 125, which is loosely journaled on a shaft 142 extending across the machine, will be raised and lowered and the clamp 121 raised and lowered by a parallel movement, so that the face of the clamp is at all times parallel to the holder plate 118.

The means for operating the clamp 122, in the particular construction shown, comprise a lifter rod 143 (see Fig. 6) passing through a steadying bracket 144 and having connected to it a lifter link 145. This lifter link is connected to one of the arms 146 of a bell-crank lever 146—147 pivoted on a stud 148. The arm 147 carries a roll 149 coöperating with a cam on a shaft 150, this shaft (see Fig. 2) being provided with a bevel gear 153 which meshes with a gear 154 on the shaft 72 before referred to, thus driving the shaft 72. The clamp 122, as shown, is further provided with a steadying pin 155 which coöperates with the bracket 144.

The means for operating the clamp 123, in the particular construction shown, include a bar 156 to which the clamp is secured, this bar being pivoted at 157 to an upright 158 on a slide 159, this slide being provided with a second upright 160 which limits the downward movement of the bar. The clamping movement of this bar 156 is effected by gravity, and its movement in the opposite direction is effected (see Fig. 5) by a hook 161 on an arm 162. This arm is of the same shape and is parallel to the arm 125 and it does not, therefore, show in Fig. 3. The arm 162 is operated by a connecting rod 163 (see Figs. 3 and 5) connected to one of the arms 164 of a bell-crank lever 164—165 pivoted on a stud 166 fast to the frame of the machine. The arm 165 carries a roll 167 which runs on a cam 168 mounted on the shaft 72. In order to hold the bell-crank lever in such a position that the roll will bear on the cam a torsion spring 169 may be provided which takes into the hub of the bell-crank and into the frame.

When the measured filler section has been fed into and clamped in the holder by the clamping mechanism described, it is, in the particular machine illustrated, separated into sub-sections which are afterward assembled with the result that a mass of tobacco is obtained of the proper length for a filler and having the proper amount of tobacco in cross-section. The separation of the tobacco is, in the machine shown, effected by means of a plurality of knives 170 secured in holders 171 fast on the cross-bar 132 described as reciprocated by the posts 134. Two of the knives are so arranged as to cut between the holder 118 and the holders 119, 120, and the third knife, in the construction shown, trims off any ends of the tobacco leaves which may extend beyond the holder 123. In the machine shown, the knives are corrugated so as to produce ends having salient and reëntrant angles in a manner well-known in the art. After the tobacco has been cut into sub-sections in the manner described the assembling operation, when the machine embodies holders of the character referred to, may be conveniently effected by moving some or all of the holders. In the particular machine shown, the holders 119 and 120 are given a movement with respect to each other and the holder 118. When the invention is embodied in a machine which contains holders which are thus made movable the character of movement given them may be varied. In the particular machine illustrated, the movement is of such a character as to superpose the sub-sections, the sub-section carried by the holder 119 being placed on top of the sub-section carried by the holder 118, and the sub-section carried by the holder 120 being placed on top of the sub-section carried by the holder 119, as indicated in Fig. 7.

In the particular machine shown, the holders lie in the same horizontal plane at the time the tobacco is forwarded and when the movement given them is such as has been described, suitable mechanism should be provided for first changing the relative vertical position of the holders and then bringing them into the superposed position. While this mechanism may be varied, in the particular machine shown, the holder 119 is mounted on a slide 172 (see Figs. 5 and 6) which is in turn mounted on a vertically reciprocating carrier 173. This carrier moves between guides 174 on the frame of the machine and has fast to its lower end a link 175 connected to a cam lever 176 provided with a roll 177 working in a cam 178 on the shaft 72 before referred to. The slide 172 moves in ways on the carrier 173 and has connected to it a link 179 fast to the arm 180 of a bell-crank lever 180—181 pivoted on the stud 148 before described. The arm 181 has connected to it a link 182 connected to a slot 183 in one of the arms 184 of a two-armed cam lever 184—185. The arm 185 carries a roll 186 operated by a cam on the shaft 150 before described.

To prevent any displacement of the sub-section of tobacco on the holder 118 suitable holding devices may be employed. In the construction shown, the carrier 173 is provided with a bent arm 187 having impaling pins 188 which work through the holder 118 and which are moved upward to impale the sub-section on the holder as the holder 119 is lifted.

The holder 120 is carried by an extension 189 from the slide 159 before described this slide working on ways 190 on a carrier 191. This carrier 191 works in ways 192 on the frame and has fast to its lower end a connecting rod 193 connected to one of the arms of a two-armed lever, the other arm 194 of this lever working in a cam 195 on the shaft 72. The movement of the slide with respect to the carrier is produced by a bell-crank lever, one arm, 196, of which is connected to the slide and the other arm 197 of which is fast to a connecting rod 198 secured in a slot 199 of the arm 200 of a bell-crank lever 200—201. The arm 201 of this lever is provided with a roll which works in a cam 202 on the shaft 72. The bell-crank 200—201 is pivoted on a stud 203 and the bell-crank 196—197 on a stud 204.

In the operation of this filler assembling mechanism which has been described, after the measured section of filler has been fed into the holders, the knives 170 descend and cut the filler in the manner described. These knives, it may be here remarked, coöperate with dies 205 (see Fig. 5) mounted on carriers 206 which are bolted to a cross-bar 207. After the knives have cut the filler and retreated, the holders are then given the movements heretofore referred to so as to bring them into the position shown in Fig. 7, the various sub-sections of filler being thus superposed upon each other.

After the sub-sections have been superposed they should be delivered from the holders. In the particular machine shown the filler formed by assembling the sub-sections is transferred to a rolling mechanism. When the invention is embodied in a machine in which the filler is formed by assembling the sub-sections and transferring them to a rolling mechanism, the transferring mechanism employed may be varied within wide limits. In the particular machine shown, there is provided a rake consisting of a plurality of fingers 208 fast on a rock-shaft 209 carried by the arm 210 (see Fig. 3) of a bell-crank lever 210—211 pivoted on a stud 212′. The arm 211 of this bell-crank is connected by a link 212 to a cam lever 213 carrying a roll 214 which works in a cam on the shaft 72 before described, the disk in which this cam is formed being marked 215, (see Fig. 5). The movement of the lever 210—211 gives the rake its reciprocating movement to swing the rake into position to engage the tobacco and to rake the tobacco out of the holders. The engaging movement of the rake teeth is effected in the machine illustrated, by providing the shaft 209 with a rock-arm 216 which has connected to it a link 217 jointed to a second link 218, this second link being secured to a guide arm 219 (see dotted lines in Fig. 3) hung on the stud 212′ before referred to. This link 218 is connected to a cam lever 220 pivoted on the stud 140 before referred to and operated from a cam formed in the disk 215, the connection to this cam, however, not being shown.

It may be remarked that after the holders have been superposed the holders 119 and 120 move down slightly, the downward movement of the holder 119 being sufficient to withdraw the pins 188 from the sub-section on the holder 118. The rake teeth are then thrown up into engagement with the sub-sections in the several holders, as indicated in Fig. 8, after which the rake is swung forward to advance the tobacco. The rake teeth forward the tobacco through a channel the bottom of which is formed by a grid having a pluraltiy of fingers 221, these fingers being bent up slightly. The upper part of the channel is formed by an inclined plate 222 carried by two posts 223 mounted on the top of the grid plate which carries the fingers 221, this grid resting on the cross-plate 207 before referred to. The inclined top and bottom of this channel serve to compress the tobacco somewhat, after which, in the particular machine shown, it is delivered to a carrier which delivers it to the bunch rolling mechanism.

The construction of the carrier may be varied. As shown, however, it comprises a base plate 224 (see Figs. 3 and 9) mounted on a slide 225 (see Figs. 3 and 4). This slide is mounted in a boss 226 cast on a yoke 227 loose on the cross rod 142. The plate 224 carries a rack 228 fast on the plate and meshing with a sector 229 supported on the cross rod 142. The sector 229 has a long hub or sleeve 230 (see Fig. 4) on which is formed a second sector 231. This second sector 231 meshes with a vertically moving rack 232 on a bar 233 (see Figs. 3 and 4). The rack bar 233 is connected by a stirrup 234 to one of the arms 235 of a bell-crank lever 235—236 pivoted on a stud 237. The arm 236 carries a cam roll 238 which coöperates with a cam formed in a disk 239 mounted on the shaft 72. It is obvious that as the rack bar 233 is raised and lowered the slide 225 will be reciprocated in its guides in the yoke 227 and will reciprocate the plate 224 accordingly. The plate 224 carries a pair of brackets 240 in which is journaled a small shaft 241 which, in the construction shown, is surrounded by a torsion spring 242. On this shaft 241 there is mounted a plate 243 which forms the top of the carrier. When the carrier is in position to receive a charge forwarded by the rake teeth 208, the plate 224 and the cover plate 243 are advanced so as to be in close proximity with the mouth of the channel formed by the parts 221 and 222. The proper position of the parts at the time a charge is to be introduced into the carrier is illustrated in Fig. 8. To facilitate the delivery of the tobacco into the carrier the shaft 241 may be provided with a short arm 244 (see Figs. 3 and 8) the upper end of this arm lying in the path of a hook 245 formed on a bracket 246 having open hubs 247, 248 which surround the cross rods 128 and 142 before described. As the end of the arm 244 strikes this hook, the plate 243 is tilted slightly, as well shown in Fig. 8, so that the charge passes readily into the carrier. As the plate 224 is moved backward by the rack and sector mechanism before described, the arm 241 passes out from under the control of the hook and the spring 242 throws the plate 243 downward, thus compressing the tobacco charge so that it will not fall out of the carrier during the subsequent operation of the transferring devices.

The backward movement of the plate 224 and the slide 225 on which it is mounted are continued until the carrier is brought into proper relative position with respect to the bunch rolling devices to be hereinafter described, this position being somewhat farther back than the parts are shown in Fig. 9. After the backward movement of the plate 224 and slide 225 has been completed, the carrier is, in the particular machine shown, swung into delivery position with respect to the rolling mechanism. The mechanism by which this swinging movement is accomplished, in the particular machine shown, comprises an arm 249 (see Figs. 1 and 4) fast to one of the hubs of the yoke 227, this arm having connected to it a link 250 in turn connected to one of the arms 251 of a bell-crank lever 251—252, the arm 252 carrying a roll which works in a cam on the shaft 72 before referred to, this cam being formed in the cam disk 195. The operation of the mechanism just described swings the yoke 227 from a position underneath the cross bar 142 to a position at the right of the bar as the parts are shown in Fig. 9. When the yoke is swung into this position the rack 232 is operated, and through the sector 231, the hub 230 and the sector 229, the rack 228 and the plate 224 are operated to move the plate vertically downward into the discharge position with respect to the rolling mechanism. The position which the plate 224 and its coöperating plate 243 occupy at this time is indicated in dotted lines in Fig. 9.

In the particular construction illustrated, the charge is delivered from the carrier after it reaches the position referred to by means of an ejector mechanism. As shown, this ejector mechanism comprises an ejector 254 (see Figs. 3, 4 and 9) working between guides 255, 256, on the plate 224. This ejector is formed to provide a rack 257 which meshes with a sector 258 mounted on a sleeve 259 which extends inside the hub 230. This sleeve 259 carries a hub 260 on which is mounted a sector 261. This sector meshes with a rack 262 formed on a rack bar 263; this bar being connected by a stirrup 264 to one of the arms 265 of a bell-crank lever 265—266. The arm 266 of this bell-crank lever carries a roll which engages with the cam disk 239 before referred to as mounted on the shaft 72. The cams which operate the two rack bars 233, 263 are so timed as to cause the various parts operated thereby to move simultaneously until the carrier formed by the plates 224, 243 reaches the dotted line position shown in Fig. 9. At this time the rack 262 is given an additional movement which drives the ejector downward, forcing the charge of tobacco out from between the plates 224 and 243, the position of the ejector at this time being shown in dotted lines in Fig. 9.

Machines which embody the invention in its best form will, as has been indicated, include a bunch rolling mechanism. The details of this bunch rolling mechanism when employed may be varied widely in construction. In the particular machine shown, there is provided a perforated bunch rolling table 267 overlying the top of a suction box 268, the pipe connection to this suction box being marked 269 (see Fig. 3). Coöperating with this perforated table is a perforated bunch rolling apron 270. This apron is connected at one end to a drum 271, this drum being provided with a pinion 272, the purpose of the drum being to take care of the slack in the apron, as usual in such constructions. The other end of the apron is secured under the forward end of the table by a bar 273. The pinion 272 before referred to is operated by a segment 274 carried on the end of a lever 275, this lever being pivoted on the cross-rod 140 before referred to and provided with a short arm 276 which carries a roll 277, this roll working in a cam 278 formed in a disk 279 mounted on the shaft 72. As usual in such constructions, there is provided a bight forming roller 280. This bight forming roller is carried by a pair of levers 281, (see Figs. 10 and 11) mounted on studs 282 which extend through ears 283 in a yoke 284. The inner ends of this yoke are connected by a cross yoke 285 which may be formed in one piece with the yoke 284. The sides of the suction box 268 are provided with ways 286 and in these ways travel guide rolls 287, supported on studs 288 mounted in the arms of the yoke. The yoke has connected to its rear end an adjustable stud 289 to which is connected a cam lever 290 provided with a roll 291 which works in a groove 292 in the cam disk 279 before described as mounted on the shaft 72.

In practical operation it has been found desirable to give the bunch a manipulating movement during the rolling operation, so as to properly work up the filler and even the bunch. While this might be done in various ways, in the construction shown it is effected by giving the bight forming roller short reverse or backward movements during its advance across the rolling table. In other words, the bight forming roll and the bunch in the bight of the apron are moved across the table by a reciprocating movement which is interrupted by reverse or backward movements of the bight forming roller. In the machine shown this is accomplished by giving the proper contour to the cam groove 292, as shown in Fig. 3ª.

Machines which embody the invention in its best form will include an automatic binder supplying means. While these binder supplying means may be widely varied in construction what is regarded as the best form will include devices for automatically cutting the binders. In the particular construction illustrated, there is provided a suction box 293, this box (see Figs. 4 and 13) supporting a knife 294 the contour of which corresponds to the binder to be cut. In order to efficiently cut the binder it should be held on both sides of the knife. In the particular construction illustrated, this is effected by dividing the suction box into two chambers 295, 296, this being accomplished by providing the box with a wall 297 which extends part way around the box. The top of the chambers 295, 296 is formed by a partition 298 having openings 299 which communicate with a chamber 300 the side wall of which is formed by the knife 294, and the top wall of which is formed by a plate 301. The partition 298 is provided with another opening or series of openings 302 which communicate with a chamber formed by a shell 303, the upper edge of which is bent over so as to lie close to the knife an opening being left between it and the knife. Openings 304 (see Fig. 1) may also be provided in the shell to increase the holding action of the suction. The suction to these chambers 295, 296 should be independently controlled to obtain the best results, so that that portion of the leaf which lies outside the knife should be held by suction in the chamber 295 while the binder, which has been cut and occupies the space on the inside of the knife, is removed. The suction in the chamber 295 is accordingly controlled through a pipe 305, and the suction in the chamber 296 through a pipe 306.

After the binder has been laid on the perforated cutting table 301 and clamped by the suction as before described, it is automatically cut. In the particular machine illustrated, this cutting operation is effected by two rolls 307, 308 (see Fig. 1) mounted on an arm 309 mounted on a vertical shaft 310 supported in suitable brackets on the frame, the lower end of this shaft being provided with a segment 311 which meshes with a segment formed on one of the arms 312 of a bell-crank lever 312—313 supported in a bracket 314. The arm 313 carries a roll which coöperates with a cam 315 mounted on the shaft 150 before referred. The mechanism described causes the two rollers to travel over the die, thus cutting out the binder.

In the particular machine illustrated, the binder after being cut is automatically transferred from the cutting table 301 to the bunch rolling mechanism. To effect this there is provided a binder carrier including a suction chamber 316 formed in a casting 317 fast on a pipe 318. This pipe has collar 319 on its end which surrounds an extension 320 of a hollow carrier arm 321. It will be understood that the extension 320 has an opening which registers with the pipe 318. The hollow arm 321 is fast on a hollow shaft 322 (see dotted lines in Fig. 4) which carries a segment 323. The shaft 322 is journaled in a casting 324 which has a passage therethrough, indicated in dotted lines at 325, this passage also extending through a boss 326 forming a part of a bracket arm 327 which supports the suction box 293. A suction pipe 328 communicates with this boss. In the operation of the mechanism, the arm 321 swings the binder transferring suction box 317 carrying the binder from the binder cutting table 301 to a position where the binder is delivered to the perforated rolling apron 270. In the particular construction shown, this is effected by a segment 329 on an arm 330 pivoted on a stud 331 (see dotted lines in Fig. 4). This arm 330 carries a roll 332 which runs in a cam groove 333 formed in the side of the disk 315 before described. It is important that the bottom perforated plate of the suction box 316 register squarely with the perforated plate 301 of the binder cutting table at the time the binder is picked up and that it register squarely with the perforated rolling apron 270 at the time the wrapper is delivered to it. In order to effect this, in the machine shown, the collar 319 of the pipe 318 is provided with a projection 334 to which is connected a link 335 secured at its other end to a pivot 336 mounted on the casting 327 before described. This link, therefore, as the arm 321 swings, always keeps the face plate of the box 317 in a horizontal position notwithstanding the position of the arm 321.

In order to facilitate the laying, cutting and delivery of the binder on the cutting table 301, this table may be made movable. In the particular construction illustrated, the table is mounted on a post 337 (see Fig. 13) which extends through a boss 338 in the chamber 296, and is surrounded at its upper end by a coil spring 339. The lower end of this post has connected to it an arm 340 (see Fig. 13 and dotted lines in Fig. 4) pivoted at 341 to a casting on the machine frame. This arm 340 carries a roll 342, which is in the path of a cam 343 on the roller carrying arm 309. As this arm 309 swings over it will cause the rollers 307, 308 to travel over the knife, the table 301 being depressed below the edge of the knife to allow a good cutting action. As the arm moves back, the table is moved upward by the spring 339, so that the binder, which has been cut, will be cleanly presented to the binder carrier.

Various mechanism may be employed for properly controlling the suction in the various instrumentalities in which it is employed. In the best constructions embodying the invention, the mechanism should be of such a character as to effect the quick transfer of the suction, when desirable, from one of the agencies employing such use, to another. In the particular machine shown, there is provided a rotary valve 344 which works in a casing 345 (see Figs. 4 and 13 to 16, inclusive). This casing 345 communicates with a pipe 346, which leads to any suitable suction producing source, such, for instance, as a fan. The valve is supported at one end by a cone bearing 347, which passes through a spider 348 located partly in the pipe 346 and partly in the casing. The valve is supported at the other end by a cone bearing 349 which is formed on a stud 350. This stud 350 is supported in a bearing 351 carried by an arm 352 extending out from the machine frame. The suction pipe 269, which communicates with the suction box of the rolling mechanism, the pipes 305, 306, which communicate with the inner and outer chambers of the binder cutting table, and the pipe 328, which communicates with the hollow arm 321 and thus causes suction to be exercised in the binder carrier, all communicate with the casing 345, as is shown in Fig. 4, and in the diagrammatic views, Figs. 12, 13 and 14, in which the run of the pipes is indicated by dot and dash lines. The valve 344 is provided with a series of ports which register with the openings in the casing 345 with which the several pipes before referred to are connected. The stud 350 supports the hub 353 of a sprocket wheel 354, this wheel being driven by a chain 355 from the sprocket 356 fast on the shaft 150, before referred to. The hub 353 has a projecting finger 357 which carries a curved rod 358, this rod working through a loop 359 on the head of the valve 344. The valve head also carries a projection 360 which coöperates with a stop 361 on a rib 362, which projects from the side of the sprocket. There is a stop hook 363 mounted on a stud 364, this stud being supported in a hanger 365 depending from the valve casing. This stud also carries a short arm 366 provided with a pin 367 which overlies the hook-arm 363. The hook arm 363 coöperates with stops 368 and 369 on the valve head, and the arm 366 is in the path of projections 370 and 371 on the rib 362. The curved rod 358 is surrounded by a spring 372.

Assuming that the parts are in the position shown in Fig. 15, as the sprocket rotates the finger 357 will compress the spring 372, as the valve is at this time held from moving by the hook arm 363, coöperating with the stop 368. As the sprocket moves, however, the rib 362 is advanced, causing the projection 370 to strike the arm 366.

This arm, through the pin 367, disengages the hook 363 from the stop 368. The spring 372, which has been compressed by the movement of the arm 357 now causes the valve to jump ahead until the stop 360 strikes the projection 361. This jumping movement of the valve is sufficient in extent to cause one port to be closed and another opened. The continued rotation of the sprocket now causes the valve to be rotated, and this rotation continues until the stop 369 is engaged by the hook 363. The motion of the valve is now stopped, and the spring 372 is again compressed, the compression continuing until the projection 371 strikes the arm 366, when the valve again jumps ahead in the manner before described. This intermittent jumping operation of the valve, as distinguished from what may be termed the "regular" operation under the direct influence of the sprocket, provides for the quick closing and opening of certain of the ports and at the same time enables all the suction agencies to be controlled from a single valve. For instance, after the binder transfer has been brought against the binder table 301, the suction should be quickly transferred from the chamber 300 to the chamber 316, that is, the opening with which the pipe 306 communicates, should be quickly closed and the opening which communicates with the pipe 328 should be quickly opened, so that the binder may be immediately transferred from the suction table 301 to the plate which forms the operative face of the binder carrier. The suction should now remain on for a comparatively longer period of time, while the transfer is moving from the plate 301 to the suction rolling table, after which the suction should be quickly cut off from the binder carrier and as quickly turned on to the box 268, in order that the binder may be immediately transferred from the carrier to the suction rolling aprons.

After the binder has been transferred to the suction rolling apron in the manner described, which occurs at about the time the charge carrier deposits the filler in the loop of the apron, this being indicated in Fig. 9 (in which the binder carrier is shown in dotted lines) the yoke 284 begins its movement and the bunch is rolled up in the binder, the yoke being given the reverse movements during the travel of the bight forming roller 280 across the table as has been previously described.

To assist in forming the bight in the apron and also to get the bight forming roller out of the way of the charge carrier as it swings down to deposit the filler, the ends of the arms 281, which carry the bight forming roller, may be provided with rolls 373. As the yoke 284 arrives at its rearmost position, these rolls 373 run up on cams 374 and tip the bight forming roll down into the position shown in Fig. 9. Springs 375 may be employed to connect the arms 281 with the yoke as shown in Fig. 10, and as the yoke moves forward and the rolls 373 run off the cams 374 the springs operate to rock the arms and elevate the bight forming roller into its proper position. As the bight forming roller moves across the table, these rollers 373 run on the top of castings 376, these being the castings in which the ways 286 are formed and hold the bight forming roller in proper position. Cams 377 may be provided near the forward end of the rolling table which the rolls 373 strike as the rolling operation is completed, these cams serving to again rock the bight forming roller downward so as to open the bight in the apron and effect the delivery of the bunch. At the time when this operation occurs, the apron is tightened by a movement of the drum 271, so that the bunch is positively forced out of the bight in the apron.

Devices may be provided for trimming one or both ends of the bunch as the rolling operation is completed. In the particular machine shown, the head or tip of the bunch is thus trimmed, this operation being effected by a knife 378 mounted on a hub 379 which surrounds a reduced end of the bight forming roller. This hub is provided with an operating arm 380. A cam 381 is located in the path of this arm, and as the rolling operation is completed the arm strikes this cam and is thrown downward, effecting the trimming operation, the knife operating against a shear-plate 382 which is mounted on the end of the rolling table. As the carriage starts back, the knife is thrown back into operative position by a torsion spring 383, of usual construction.

In making cheaper grade cigars, especially those in which the filler is of the variety known as "short" filler, it is customary to shape the bunches after they are made by placing them in molds in which they are allowed to remain for a considerable period of time, say, from eight to twelve hours. In making such cigars, the filler is not carefully measured, and the molding operation is depended upon to give the filler its shape. In making high grade cigars, when the filler is carefully measured and properly shaped, such a molding operation as has been referred to is unnecessary. It has been found advantageous, however, in the making of long filler cigars by machinery, to subject the bunches, after rolling, to a shaping operation, which continues for a short time only, and the purpose of which is to insure the proper relative position of all parts of the filler in the bunch, but without unduly compacting the filler at any place in the bunch. For instance, if certain parts of the filler should be exceptionally stiff, as compared with the remainder of the filler in the bunch, the shaping operation referred to will force these stiff pieces into their proper relative position in the bunch, and accomplish this without unduly compacting the bunch. Machines which embody the invention in its best form, therefore, will include means for effecting such shaping operation as has just been referred to. The specific means by which the shaping operation is effected (when the machine includes such shaping means) may be widely varied. In the particular machine illustrated, the shaping operation referred to is effected by a shaper which is provided with a plurality of shaping cavities. In the best construction embodying the invention, and as shown, these shaping cavities will consist of a plurality of independent molds comprising cups or body portions 384 and covers 385 (see Figs. 17, 21, 24 and 25). Where a plurality of independent molds of the character referred to are employed for carrying the invention into effect, these cups may be given a traveling movement so that the cups may be successively brought into position to receive the bunches, and emptied. As shown, each of the cups is provided with a number of hardened studs 386, these studs engaging in a track comprising two members 387 of generally oval shape suitably supported in the machine. The means employed for effecting the traveling movement may be varied. In the best constructions, the movement will be an intermittent one, so that each mold may be stationary during the supplying of the bunch thereto and the delivery of the bunch therefrom. In the particular construction shown, there is provided a shaft 388 supported in side frames 389, these frames serving to carry the shaper mechanism. This shaft 388 supports a bevel gear 390, which runs loose on the shaft. This gear meshes with a similar gear 391 on a diagonally arranged shaft 392 (see Figs. 2 and 23). This shaft 392 has at its lower end a bevel gear 393 which meshes with a bevel gear 394 on the shaft 150, before referred to. It may be here remarked that this shaft 150 is a two-part shaft, the parts of the shaft being connected by a jaw clutch 395, the purpose of this construction being to enable the shaping mechanism and the parts coöperating therewith to be run independently of the bunch making mechanism, for the purpose of working up the bunches remaining in the mold after the bunch mechanism has been stopped.

The shaft 388 is provided with a hub 396, this hub carrying a sprocket wheel 397 which engages the studs 386 on one end of the mold cup. The shaft also carries a second sprocket wheel 398, which engages the studs on the other end of the mold cup. The hub of the bevel gear 390, before referred to, carries a mutilated gear 399, the teeth of which mesh with a mutilated pinion 400 (see Fig. 21) this mutilated pinion 400 being provided with a broad locking tooth 401 which engages the untoothed portion of the gear 399 and locks it against movement, except at such times as its teeth are in mesh with the teeth on the pinion 400. The pinion 400 is mounted on a shaft 402, this shaft being supported in a bearing 403 in one of the side frames 389, before referred to. The shaft 402 has, on the end opposite the end which carries the pinion 400, a semi-circular projection 404, and fast to the end of this projection is a crank arm 405, provided with a roll 406. This roll 406, on each revolution of the shaft 402, engages between teeth 407 on an annulus 408 mounted on the hub 396, before referred to. This hub also carries another annulus 409 which is provided with concave recesses formed between teeth 410. The semi-circular hub 404 engages in these recesses on each revolution of the shaft 402, and serves to lock the hub 396 from movement except during such times as the crank arm 405 is operating to turn the hub. It will be understood that the construction described advances the molds around the track one step, or the width of one mold for each revolution of the shaft 402, and that during the time when the shaft 402 is not turning its coöperating hub, all the parts of the mechanism are firmly locked. This locking mechanism is of importance, because it holds the molds firmly in the predetermined position at which they are stopped so that the bunch supplying mechanism, to be hereinafter referred to, may accurately deliver the bunches to the molds. While the particular mechanism illustrated has proved efficient in practice, it will be understood that any other suitable mechanism may be substituted for it without departing from the invention. Although the construction may be varied in this respect, in the particular machine shown, each of the covers 385 is firmly locked to its coöperating cup after being placed thereon. As shown, this locking is effected by providing each cover with two bolts 411 (see Figs. 24 and 18). These locking bolts engage cavities in ribs 412, formed on the cup between which ribs the cover is located when in position, the bolts being thrown forward by springs 413. Each of the bolts in the particular construction illustrated is provided with a pin 414 which coöperates with the unlocking mechanism to be hereinafter described.

In machines embodying the invention in its best form, the bunches will be automatically taken from the bunch rolling mechanism and transferred to the shaper. The construction by which this automatic transfer of the bunches is effected may be widely varied in its construction. As illustrated (see more particularly Figs. 17 and 21) there is provided a carriage 415 which comprises a box-like casting, this carriage being provided on each of its ends with rolls 416 which engage a track consisting of side members 417 suitably supported on the bed plate of the machine. This carriage, when employed, may be moved by suitable mechanism. As shown, the carriage is provided with a depending yoke 418, to which is secured at one of its ends a connecting rod 419, this rod being fast at its other end to an arm 420 on a hub 421. This hub 421 is supported on a stud 422 suitably mounted on the frame and is provided with an arm 423 carrying a roll 424 which engages in a cam groove 425 on a cam drum 426, this drum being mounted on the shaft 150, before referred to.

In the particular machine illustrated, the carriage serves to operate a support which receives the bunches from the rolling mechanism and carries them to the shaper. The details of construction of this support, when employed, may be widely varied. As shown, inasmuch as the carriage reciprocates underneath the lower run of the mold supporting tracks and underneath the line of travel of the mold, the supporting structure includes a lifting device which delivers the bunch from the support to the molds. It is to be understood, however, that constructions embodying the invention might be employed in which such lifting device will be unnecessary. Referring more particularly to Figs. 17, 21 and 23, the box-like casting 415, which forms the carriage, is provided at one end with projections 427, which, in connection with suitable straps or guide pieces 428, form ways in which is located a slide 429. This slide has a central perforation in which is located a post 430, this post being supported by a spring 431. This post carries an L-shaped block 432 which forms the side and bottom of the support. The bottom of this L-shaped block (see Fig. 23) is provided with a boss 433, through which passes a pin 434 which secures the block to the post. The bottom of this L-shaped block 432 is also provided with depending ears 435, to which ears are pivoted, at 436, two arms 437, which carry a jaw 438, this jaw forming a movable side of the support. One of the arms 437 is provided with an operating projection 439. The movable jaw 438 is pulled over into operative position with respect to the fixed jaw formed by the upright portion of the L-shaped block 432 by means of a spring 440. The movement of the carriage places the bunch support in position to receive the bunch from the rolling table, as is well shown in Fig. 3. At the time when the support reaches the bunch receiving position the movable jaw is thrown back, as indicated in Fig. 3, this being accomplished in the particular machine illustrated by means of a cam block 441 mounted on a rocking stud 442 supported on a bracket 443 at one end of one of the ways 417. This stud 442 is provided with an operating arm 444 which is connected by a link 445 (see Figs. 17 and 2) to an arm 446 on a rock shaft 447 mounted in one of the side frames 389. This rock shaft is provided with an operating arm 448, which is in the path of a cam 449 bolted to the side of the mutilated gear 399, before referred to. The shaft 442 has projecting from it an arm 450, which is connected by a spring 451 to the frame, the arm and spring operating to hold the cam 441 in an operative position, as shown in full lines in Fig. 3, and in dotted lines in Fig. 17. As the carriage reciprocates the arm 439 strikes the cam and the movable jaw is rocked into the open position to receive the bunch. The cavity between the upright part of the block 432 and the jaw 438, is shaped to correspond to the contour of the bunch, and the bunch is forced down into this cavity by the action before described of the bight forming roll 280 and the apron controlling drum 271. When the bunch has been deposited on the support, the roll on the arm 448 runs on to the cam 449 and the cam block 441 is rocked down, thus permitting the spring 440 to close the jaw so that the bunch is firmly held in the support.

Ordinarily, in the operation of machines embodying the invention, the shaper molds will be kept full, so that in order to place a bunch in a mold it is first necessary to remove the bunch contained therein and which has been shaped by the mold during its travel around the track, and the machine which has been selected to illustrate the invention operates in this manner. When machines embodying the invention operate in the manner described, it is necessary to remove the bunch to make a place for the bunch which has been supplied to the bunch support by the rolling mechanism. In the best constructions, this will be done automatically. While the bunch removing mechanism employed may vary widely in construction, in the particular machine illustrated the bunch removing mechanism is of such a character as to simultaneously remove a bunch and a cover, the cover of the mold being utilized in the bunch removing mechanism as a carrier, by which the bunch is transported to a delivery point. It will be remembered that in the machine shown the cover of each mold is locked to the body of the mold, and, therefore, in the machine shown the bunch removing mechanism includes as one of its features an unlocking mechanism. When the bunch removing mechanism includes an unlocking mechanism, this may well be constructed to also effect the removal of the cover from the mold.

In the particular machine illustrated, the forward end of the box-like casting, which forms the carriage 415, is provided with two sets of upper and lower bearings 452 (see Fig. 18). Shafts 453 are located in these bearings, each of which shafts is provided with a collar 454, which determines the limit of the downward movement of the shaft. Each shaft is provided with a key way 455, which are engaged by keys on the hubs 456 of gears 457, the hubs of these gears being supported between the upper and lower bearings 452 on the carriage. These shafts are given an alternate rotary movement by a rack bar 458, provided with a roll 459, which engages in a fork 460 of a lever 461, this lever being pivoted on a stud 462 mounted on one of the ways 417. This lever 461 is connected by a twisted link 463 (see Fig. 26) to one of the arms 464 of a bell crank lever 464, 465, this lever being pivoted at 466 to a stud properly supported in the machine. The arm 465 of this lever carries a roll 466$^a$ which works in a cam groove in the end of the cam and drum 426, before described, as mounted on the shaft 150.

In addition to the alternate rotary motion given the shafts 453 by the mechanism just described, these shafts also have, in the particular machine shown, a reciprocating motion in the direction of their length. To effect this, the lower ends of the shafts 453 (see Fig. 26) carry a cross-head 467, this cross-head being held on the shaft by collars 469 and being provided with hubs 468 which support the shafts. The cross-head is provided with a recess 470, which is arranged, when the carriage is in the proper position, that is, when it is in a position where the shafts are to be reciprocated longitudinally, to receive a head 471 (see Fig. 17), on a lifter rod 472. This lifter rod works through an opening in a part of the frame of the machine and is actuated by a lever 473 pivoted on the stud 466 before described. The other end of this lever is provided with a cam roll 474, which works in a cam groove on the end of the cam drum 426, before referred to. The slot 470, when it is not engaged by the head 471 of the rod 472, is engaged by the top 475 of a rib 476, so that the cross-head and the shaft are locked against vertical movement at all times except when engaged by the head of the lifter 472.

The tops of the shafts 453 are provided with plates 477, these plates being notched at 478, as shown in Fig. 19. These plates carry short undercut key projections 479, which key projections, when the shafts are elevated, pass through grooves 480 milled in the covers of the molds, as shown in Fig. 24. Back of these grooves 480, the cover is bored to provide a circular recess 481. This bore does not extend quite through the cover, so that ledges are formed which may be engaged by the shoulders on the undercut key projections 479 (see Fig. 25).

Assuming a bunch is to be removed from the mold, the carriage 415 is brought into the position shown in Figs. 17 and 18, at which time, as before stated, the head on the rod 472 engages the recess 470 in the cross-head. The shafts are then raised until the undercut key projections 479 have passed into the openings 481 of the cover. The shafts are then given a quarter turn by the mechanism described, which causes the shoulders on the undercut key projections to engage the ledges at the bottom of the bores 481. At the same time one side of each of the notches 478 engages the pins 414 on the locking bolts 411, throwing back the bolts. The crosshead is now pulled down by the rod 472, thus positively removing the cover from the mold and carrying the bunch with it.

It may, and, in fact, usually will happen that the bunch will adhere so strongly to the mold that it will not follow the cover as it is removed. In the best constructions embodying the invention, therefore, an ejector mechanism will be provided to insure the positive delivery of the bunch. While this ejector mechanism may be variously constructed, in the particular machine shown, the shaft 388 supports a collar 482 which is loose on the shaft, the collar (see dotted lines in Fig. 21) being provided with a guide 483 through which works a rod 484. The lower end of this rod is provided with a cross-head 485 in which are mounted ejector pins 486. The bottom of the body of the mold is provided with perforations 487 (see Fig. 23) with when the ejector pins register. The ejector rod 484 carries a collar 488 to which is secured a link 489 which is secured at its other end to an arm 490 on a short rock-shaft 491 supported in the frame pieces 389. This rock shaft (see Fig. 21) is provided with an operating arm 492 to which is connected a yoke rod 493, the yoke of this rod embracing the shaft 388. This rod carries a roll 494 coöperating with a cam groove 495 formed in a boss 496 mounted on the back of the mutilated gear 399.

In the particular machine shown, after the bunch and cover have been removed, the carriage is moved to carry the shaped bunch to a delivery position and to bring the bunch in the support 432, 438 into position to be inserted into the mold cavity from which a bunch has just been removed, this position of the parts being shown in Fig. 21.

It has been heretofore stated that in the construction of the machine illustrated the bunch support is provided with an ejector mechanism. This ejector mechanism (see Fig. 23) comprises a shaped plate 497 carried by posts 498 formed in one piece with the slide 429 before described. This slide 429 is provided with a recess 499 shaped so as to receive the head of the rod 472 before described. It may be remarked that the machine is provided with a web 500 which has a rib 501 which engages the recess 499 when it is not engaged by the head 475 of the rod 472, so as to lock the slide against vertical movement except when the delivery of the bunch is to be effected. In the operation of the mechanism just described the bunch support and ejector travel up together until the top of the L-shaped plate 432 and the jaw 438 strike the edges of the mold cup or body. This stops the upward movement of the support but the slide continues to travel upward, compressing the spring 431, this allowing the ejector or lifter mechanism to insert the bunch in the mold cavity where it is held by frictional adhesion to the walls of the mold cavity. The lifter mechanism and the mold support now retreat and the carriage moves backward to bring the support into position to receive a fresh bunch from the rolling mechanism. As the carriage reaches the limit of its backward movement the rod 472 again engages the cross-head 467 of the bunch removing mechanism, and the shafts 453 which are still carrying the mold cover, are raised. It will be understood, of course, that prior to this operation the bunch which has been supported on the cover has been removed. This upward movement of the shafts 453 forces the cover on the mold. The shafts are then given a reverse quarter turn which forces the spring bolts to lock the cover to the mold and at the same time brings the key projections 479 into position so that they can pass out of the recesses 481 as the shafts are moved downward. The series of molds is now advanced one step by the mechanism before described for that purpose and the operations are repeated.

Machines which embody the invention in its best form will include a wrapping mechanism to which the bunches after being removed from the shaper are transferred. When the bunches are to be thus transferred to a wrapping mechanism machines embodying the invention in its best form will include automatic transferring devices for this purpose, the construction of which may be widely varied. In the particular construction shown, a transferring arm 502 (see Figs. 1, 21, 22 and 26) is provided which is supported on a shaft 503 mounted in a bracket 504 extending from the machine frame. This shaft 503 is provided with a pinion 505 meshing with a vertically reciprocating rack 506 held up to its duty by means of a roll 507. The rack 506 is formed on a bar 508 connected by a stirrup 509 to a lever 510 pivoted on a cross rod 511 carried by the machine frame. The lever 510 is provided with a roll 512 working in a cam groove 513 formed in a cam drum 514 mounted on a shaft 515 (see Fig. 2) provided with a worm gear 516 which meshes with a worm 517 on the main drive shaft 518 of the machine.

In the particular machine shown the arm 502 carries two brackets 519, these brackets being bent at their ends to form abutments or bunch holding fingers 520. Each of these brackets supports a bell-crank lever 521—522, the pivot point of the lever being indicated at 523. The arms 521 of these bell-crank levers form bunch holding fingers which coöperate with the abutments or fingers 520. The arms 522 are provided with pins 524 which are engaged by the forks of arms 525 pivoted on a rock-shaft 526 supported in the brackets 519. The rock-shaft 526 has an operating arm 527 carrying a roll which coöperates a contact stud 528. A spring 529 is provided which hooks over the stud 524 and over a post 530 on the bracket 519. When the pin 530 passes a line between the centers 523 and 526 in either direction this spring tends to carry the pin farther along in its direction of movement; or, in other words, causes the pin to pass the center, so that the spring tends to hold the gripper fingers 521 either in an open or closed position. As the arm 502 swings downward the roll on the arm 527 strikes the contact stud 528 and forces the stud 524 downward below the center line between the centers 523 and 526, the spring 529 assisting in this movement after the center has been passed.

A lifter mechanism may be employed to lift the bunch away from the cover when the cover is employed to support the bunch at the delivery point, in order that it may be readily seized by the fingers 520, 521. In the particular machine illustrated, this lifter mechanism comprises two pins 531 which pass through a web 532 connecting the upper bosses in which the bearings 452 on the carriage 415 are formed, and through ears 533 extending from the bosses in which the lower bearings 452 are formed. These pins 531 are surrounded by springs 534, each spring bearing on a collar 535. In order to raise these lifter rods a rock shaft 536 is provided, this shaft carrying a hub 537 at the ends of which are located lifter arms 538. These lifter arms are provided with pins 539 which take under the collars 535. The cover is provided with perforations through which the pins 531 work, one of these perforations, 540, being shown in Fig. 24. The shaft 536 is provided with an operating arm 541 the tail of which lies in the path of a spring plunger 542. The head of this plunger is in the path of an adjustable operating pin 543 mounted on a block 544 secured to the underside of the arm 502 (see Figs. 22 and 26). As the arm 502 descends, therefore, this spring plunger is struck by the pin and the lifter mechanism operated to lift the bunch from the mold cover into the grasp of the fingers 520, 521.

In making a high grade cigar before the wrapper is applied the ends of the bunch should be trimmed. It has been already stated that the tip end of the bunch is trimmed while the bunch is under the control of the bunch rolling apron. The trimming of the tuck end of the cigar may be effected in any suitable way, but may be conveniently effected during the transfer from the shaper to the wrapping mechanism. In the particular machine illustrated, the trimming is effected during the transfer of the bunch and while it is in the grasp of the transferring fingers 520—521. In the particular machine shown, the block 544 carries a stud 545 upon which are hung a pair of shear plates 546, 547 (Fig. 21). The upper ends of these shear plates are provided with rollers 548. A coil spring 549 is employed which tends to hold the upper ends of the shear plates together so as to force the lower ends which are provided with cutting edges 550 apart, so that the tuck end of the bunch when the bunch is held by the fingers 520, 521 will lie between the cutting edges on the shear plates. A stop 551 is employed to limit the inward movement of the upper ends of the shear plates. As the arm 502 swings over, after seizing a bunch, the rolls 548 pass on either side of a wedge shaped cam 552 formed on the top of the bracket 504. This wedge shaped cam spreads the rolls and forces the lower ends of the shear plates together so as to trim the bunch.

In the particular machine shown the transferring arm 502 deposits the bunch on a rest consisting of plates 553 mounted on posts 554 carried on the bracket 504, the bunch being taken from this rest by other transferring devices which carry it to the wrapping mechanism. As the arm 502 comes into delivery position (see dotted lines in Fig. 26) the roll on the arm 527 strikes a cam post 555 rocking the shaft 526 and causing the fingers 520, 521 to be separated, the springs 529 operating to hold the fingers open after the stud 524 has passed the center line between the centers 523 and 526.

The wrapping mechanism when the invention is embodied in a machine which employs a wrapping mechanism, may be of any suitable type. A wrapping mechanism is conventionally indicated at 556 in Fig. 1. As the details of this mechanism form no part of the present invention it will not be described further than to say that a driving mechanism for the wrapping mechanism is indicated at 557.

When the invention is embodied in a machine which employs transferring devices to transfer the bunch from the bunch removing mechanism to a rest intermediate the bunch delivery point and the wrapping mechanism any suitable devices may be employed to take the bunch from the rest and transfer it to the wrapping mechanism. In the particular machine illustrated, the transfer of the bunch from the rest 553 to the wrapping mechanism is effected by an arm 558 mounted on a vertical shaft 559. This arm may be similar to the transferring arm employed in the patent to Tyberg, No. 947,870, dated Feb. 1, 1911, for transferring bunches on the chain carrier shown in that patent to the wrapping mechanism shown in that patent and need not be here described other than to say that the arm, as in the patent referred to, carries two holders 560, 561 one of which removes the bunch from the rest and takes it to the wrapping mechanism and the other of which receives the wrapped cigar from the wrapping mechanism. In the machine shown, the carrier arm is given suitable movements to cause it to first take the cigar from the wrapping mechanism, then swing over and take the bunch from the rest 553, and then deposit the wrapped cigar in the rest, the movements being generally similar to that of the arm referred to in the Tyberg Patent No. 947,870. The wrapped cigar may be removed from the rest in any suitable manner or by any suitable mechanism, not shown.

Machines which embody the invention in its best form and which automatically perform all the operations incident to the making of a cigar will include means for automatically cutting the wrapper, and means for thereafter automatically transferring the wrapper thus cut to the wrapping mechanism. The particular means employed for effecting this automatic cutting and transferring of the wrapper may be widely varied in construction. In the particular machine shown, there is employed a suction cutting bed 562 provided with a knife 563. A wrapper leaf is laid upon this suction bed in the same manner as the binder leaf is laid upon the binder cutting bed heretofore described, and the wrapper is then cut out by a roll 564 carried on an arm 565 which may be reciprocated over the cutting bed by suitable mechanism, not shown. The suction mechanism employed in connection with the suction cutting bed may be of any suitable character, such, for instance, as the mechanism hereinbefore described in connection with the binder cutting bed, the main difference being in the shape of the knife or die due to the fact that binders and wrappers are usually different in shape. After the wrapper is cut, it may be transferred to the wrapping mechanism by suitable transferring device, such as a suction wrapper carrier 566, the suction connection to this wrapper carrier being indicated at 567. The mechanism for operating this wrapper carrier may be generally similar to that described in the patent to Tyberg No. 654,203, dated July 24, 1900. The cam plate for controlling the movements of the wrapper carrier is indicated at 568. The connections by which the cam plate effects the necessary movements of the carrier are generally illustrated and will be readily understood without a specific description. It may be remarked, however, that these connections contain certain features of novelty which are not herein claimed but which are claimed in a companion application No. 637,472 filed at even date therewith.

It has been heretofore stated that the shaft 518 (see Fig. 2) is the main driving shaft and that this shaft drives the shaft 515 through the worm and worm gear 516, 517. The shaft 515 is also provided with a driving gear 569 which meshes with a driving gear 570 which is loose on the shaft 150 but which may be connected thereto by a clutch, a jaw-clutch being indicated at 571. The construction of the jaw clutch is such that when, after any one of the mechanisms is operated independently of the others, the jaws are reëngaged they automatically restore the timed relation of the several mechanisms. This enables the wrapping mechanism to be independently driven without driving the bunch forming or shaping mechanisms. This is an important feature because in case some bunches are improperly wrapped during the operation of the machine, as for instance, during a day's run, they may be collected and rewrapped by the wrapping mechanism without driving the other parts of the machine.

The several mechanisms which have been specifically described have proved efficient in practice. It is to be understood, however, that the invention claimed is not limited to the specific details of construction hereinbefore described, as other mechanisms than those described may be employed for carrying the invention into effect.

It will be also understood that while the invention comprehends the production of long filler cigars by mechanism which performs all the steps automatically incident to the manufacture of such cigars, the invention may be embodied in machines in which some of the operations are not automatically performed.

It will also be understood that certain features of the invention are capable of independent use and that such independent use is contemplated. In general, therefore, the invention is not to be restricted to the specific features of construction hereinbefore described and illustrated in the accompanying drawings.

What is claimed is:—

1. In an automatic mechanism for making long filler cigars, the combination with means for forwarding a mass of long filler, of filler measuring means, means for separating measured amounts of filler from the mass, bunch making devices, means for transferring measured amounts of filler to the bunch making devices, a shaper constructed to simultaneously hold a plurality of bunches, a wrapping mechanism, and transferring devices for effecting the transfer of the bunches from the bunch making mechanism to the shaper and from the shaper to the wrapping mechanism.

2. In an automatic mechanism for making long filler cigars, the combination with filler measuring means, of means for forwarding a mass of long filler, devices whereby the measuring means controls the operation of the forwarding means, means for separating measured amounts of filler from the mass, bunch making devices, means for transferring measured amounts of filler to the bunch making devices, a shaper constructed to simultaneously hold a plurality of bunches, a wrapping mechanism, and transferring devices for effecting the transfer of the bunches from the bunch making mechanism to the shaper and from the shaper to the wrapping mechanism.

3. In an automatic mechanism for making long filler cigars, the combination with means for feeding a mass of long filler, of filler measuring means, bunch rolling mechanism, means for separating measured amounts of filler from the mass and transferring them to the bunch rolling mechanism, a binder cutting mechanism, means for automatically transferring the binders from the cutting mechanism to the rolling mechanism, and a wrapping mechanism to which the bunches are automatically transferred from the rolling mechanism.

4. In an automatic mechanism for making long filler cigars, the combination with means for forwarding a mass of long filler, filler measuring means, means for separating measured amounts of filler from the mass, a bunch rolling mechanism, means for transferring measured amounts of filler to the bunch making devices, a binder cutting mechanism, means for automatically transferring the binders from the cutting mechanism to the rolling mechanism, a shaper constructed to simultaneously hold a plurality of bunches, a wrapping mechanism, and transferring devices for effecting the transfer of the bunches from the bunch making mechanism to the shaper and from the shaper to the wrapping mechanism.

5. In an automatic mechanism for making long filler cigars, the combination with a bunch rolling mechanism, of means for automatically supplying filler thereto, a binder cutting mechanism, means for automatically transferring the binders from the cutting mechanism to the rolling mechanism, and a wrapping mechanism to which the rolled bunches are delivered.

6. In an automatic mechanism for making long filler cigars, the combination with a bunch rolling mechanism, of means for automatically supplying filler thereto, a binder cutting mechanism, means for transferring binders from the cutting mechanism to the rolling mechanism, a wrapping mechanism to which the bunches from the rolling mechanism are automatically delivered, a wrapper cutting mechanism, and means for transferring the cut wrappers to the wrapping mechanism.

7. In an automatic mechanism for making long filler cigars, the combination with a bunch rolling mechanism, of means for supplying filler thereto, a binder cutting mechanism, means for transferring the binders from the cutting mechanism to the rolling mechanism, a shaper constructed to simultaneously hold a plurality of bunches, a wrapping mechanism, transferring devices for effecting the transfer of the bunches from the rolling mechanism to the shaper, and from the shaper to the wrapping mechanism, a wrapper cutting mechanism, and means for transferring the wrappers to the wrapping mechanism.

8. In an automatic mechanism for making long filler cigars, the combination with means for forwarding a mass of long filler, of filler measuring means, means for separating measured amounts of filler from the mass, a bunch rolling mechanism, means for transferring measured amounts of filler to the bunch making devices, binder cutting mechanism, means for transferring the binders from the cutting mechanism to the rolling mechanism, a shaper constructed to simultaneously hold a plurality of bunches, a wrapping mechanism, transferring devices for effecting the transfer of the bunches from the bunch making mechanism to the shaper and from the shaper to the wrapping mechanism, a wrapper cutting mechanism, and means for transferring the wrappers to the wrapping mechanism.

9. In a filler forming mechanism, the combination with means for forwarding a section of long filler tobacco sufficient to form a single bunch filler, of means for separating the section into sub-sections, and means for assembling the sub-sections into a filler.

10. In a filler forming mechanism, the combination with means for forwarding a section of long filler tobacco sufficient to form a single bunch filler, of means for separating the section into sub-sections, means for assembling the sub-sections into a filler, and a bunch rolling mechanism to which the filler is delivered.

11. In a filler forming mechanism, the combination with filler forwarding means, of a movable measuring abutment against which the filler is fed, stopping devices for the forwarding means controlled by the abutment, means for dividing a measured filler section from the mass, means for separating the section into sub-sections, and means for assembling the sub-sections into a filler.

12. In a filler forming mechanism, the combination with filler forwarding means, of a movable measuring abutment against which the filler is fed, stopping devices for the forwarding means controlled by the abutment, means for dividing a measured filler section from the mass, means for separating the section into sub-sections, means for assembling the sub-sections into a filler, and a bunch rolling mechanism to which the filler is delivered.

13. In a filler forming mechanism the combination with means for dividing a section of filler tobacco into sub-sections, of holders for the sub-sections, and means for effecting a relative movement of the holders to assemble the sub-sections into a filler.

14. In a filler forming mechanism the combination with means for forwarding a measured filler section, of a cutter for dividing the measured section into sub-sections, and means for assembling the sub-sections into a filler.

15. In a filler forming mechanism, the combination with means for measuring a filler section, of means for forwarding the section thus measured, means for dividing the measured section into sub-sections, and means for assembling the sub-sections into a filler.

16. In a filler forming mechanism, the combination with a plurality of filler holders, of means for separating the filler between the holders, and means for shifting the holders to assemble the sub-sections of filler therein into a filler.

17. In a filler forming mechanism, the combination with means for forwarding a measured section of filler tobacco, of means for thereafter forming the section into a filler, and a rolling mechanism to which the filler is delivered.

18. In a filler forming mechanism, the combination with a plurality of filler holders, some of said holders including in their construction filler clamping devices, of means for operating said clamping devices to permit the ready introduction of filler into the holders, and means for thereafter moving the holders to assemble the tobacco sections held by the holders.

19. In a filler forming mechanism, the combination with means for forwarding a measured section of filler tobacco, of a plurality of holders for receiving said section, some of said holders including in their construction clamping devices, means for operating the clamping devices to permit the ready introduction of the tobacco section into the holders, means for dividing the tobacco between the holders into sub-sections, and means for producing a relative assembling movement of the holders to assemble the sub-sections into a filler.

20. The combination with means for forwarding a measured section of filler tobacco, of means for dividing said measured section into sub-sections, means for assembling said sub-sections to form the same into a filler, a rolling mechanism to which the formed filler is automatically delivered, and means for supplying a binder to the rolling mechanism.

21. The combination with means for forwarding a measured section of filler tobacco, of means for dividing said measured section into sub-sections, means for assembling said sub-sections to form the same into a filler, a rolling mechanism to which the formed filler is automatically delivered, means for supplying a binder to the rolling mechanism, and a wrapping mechanism to which the bunches from the rolling mechanism are delivered.

22. The combination with means for forwarding a measured section of long filler tobacco, of means for forming the section into a filler, a bunch rolling mechanism to which the filler is automatically delivered, means for supplying binders to the bunch rolling mechanism, a shaper arranged to simultaneously hold a plurality of bunches, a wrapping mechanism, and means for effecting the transfer of the bunches from the rolling mechanism to the shaper and from the shaper to the wrapping mechanism.

23. The combination with means for forwarding a measured section of long filler tobacco, of means for forming the section into a filler, a bunch rolling mechanism to which the filler is automatically delivered, means for supplying binders to the bunch rolling mechanism, a shaper arranged to simultaneously hold a plurality of bunches, a wrapping mechanism, and means for effecting the transfer of the bunches from the rolling mechanism to the shaper and from the shaper to the wrapping mechanism.

24. The combination with means for forwarding a measured section of filler tobacco, of a plurality of holders to which the section is fed, a knife for dividing the section into sub-sections, and means for effecting a relative movement of the holders to assemble the sub-sections into a filler.

25. In a filler forming mechanism, the combination with means for forwarding a section of filler tobacco, of a plurality of holders, means for dividing the section into sub-sections, means for effecting a relative sidewise movement of the holders to superpose the sub-sections upon each other, and means for delivering the superposed sections from the holders.

26. In a filler forming mechanism, the combination with means for forwarding a section of filler tobacco, of a plurality of holders, means for separating the tobacco between the holders into sub-sections, and means for effecting a relative sidewise movement of the holders to assemble the sub-sections into a filler.

27. The combination with means for forwarding a section of filler tobacco, of a plurality of holders including a central and end holders, of means for separating the section into sub-sections, means for moving the end holders with respect to the central holder to assemble the sub-sections into a filler, and means for thereafter delivering the filler.

28. The combination with means for forwarding a section of filler tobacco, of a plurality of slotted holders which receive the section, means for separating the section into sub-sections, means for effecting a relative movement of the holders to assemble the sub-sections into a filler, and a delivery mechanism working through the slots in the holders for delivering the filler.

29. The combination with means for forwarding a section of filler tobacco, of holders therefor including a central and end holders, means for separating the section into sub-sections, means for moving the end holders with respect to each other and the central holder to assemble the sub-sections into a filler, a rolling mechanism, and means for delivering the assembled filler from the holders to the rolling mechanism.

30. The combination with means for forwarding a section of filler tobacco, of a plurality of holders, means for separating the section into sub-sections, a slide on which one of the holders is mounted, means for shifting the position of the slides to bring the holder out of register with the other holders, and means for moving the slide to assemble the sub-sections.

31. The combination with means for forwarding a section of filler tobacco, of means for separating the section into sub-sections, a plurality of holders including a central and end holders, slides on which the end holders are mounted, means for moving the slides to bring the holders out of register with the central holder and with each other, means for moving the slides in assembling position, and means for removing the subsections from the holders.

32. The combination with means for forwarding a section of filler tobacco, of means for separating the section into sub-sections, a plurality of holders including a central and end holders, slides on which the end holders are mounted, means for moving the slides to bring the holders out of register with the central holder and with each other, means for moving the slides into assembling position, means for removing the sub-sections from the holders, and a rolling mechanism to which the section is delivered.

33. In a bunch making machine, the combination with a rolling means, of operating devices for giving the bunch a backward movement during the rolling operation to manipulate the filler.

34. In a bunch rolling mechanism, the combination with the rolling table, the apron and the bight forming roller, of means for causing the bight forming roller to have a backward movement during its advance across the rolling table to manipulate the bunch.

35. In a bunch rolling mechanism, the combination with the rolling table, the apron and the bight forming roller, of means including a suitable cam mechanism for advancing the roller across the table, said mechanism being constructed to give the bight forming roller a backward movement during its advance across the table in order to manipulate the bunch.

36. In a bunch rolling mechanism, the combination with a perforated rolling table, of a suction mechanism coöperating therewith, a perforated rolling apron, a bight forming roller, and operating means constructed to give the roller a reverse movement during its advance across the rolling table.

37. The combination with a source of suction, of a suction cutting bed, a suction rolling mechanism, a suction carrier operating between the bed and the rolling mechanism, independent connections from the source of suction to each of said devices, and a valve mechanism operative to control said connections in timed inter-relation.

38. The combination with a suction cutting bed, of a suction rolling mechanism, a suction carrier between the suction bed and the rolling mechanism, a suction pipe, a valve casing in communication with the pipe, a rotary valve in said casing, and independent connections from the casing to the bed, the carrier and the rolling mechanism.

39. The combination with a cutting bed comprising inner and outer suction chambers, of a knife located between the chambers, a coöperating cutting mechanism, a suction rolling mechanism, a carrier operating between the bed and the rolling mechanism, a suction pipe, a valve casing, independent connections from the valve casing to the chambers in the bed, the carrier and the rolling mechanism, and a rotary valve in the casing operative to control said connections in timed inter-relation.

40. The combination with a suction rolling mechanism, a suction cutting bed and a suction carrier operating between the bed and the rolling mechanism, of independent connections from the source of suction to said cutting bed and said suction carrier, and a valve mechanism operative to control said connections in timed inter-relation.

41. The combination with a suction rolling bed, a suction cutting bed, and a suction carrier, of independent connections from the source of suction to said rolling bed, said cutting bed and said suction carrier, and a valve mechanism operative to control said connections in timed inter-relation.

42. The combination with a suction rolling bed, a suction cutting bed, a suction carrier operating between the two, of a valve casing, independent connections from the valve casing to these various instrumentalities, a rotary valve in the casing, and means for giving the valve a jumping movement to effect the quick transfer of the suction from one instrumentality to another.

43. The combination with a suction rolling bed, a suction cutting bed, a suction carrier operating between the two, of a valve casing, independent connections from the valve casing to these various instrumentalities, a rotary valve in the casing, and means for giving the valve intermittent jumping and regular movements to effect the quick transfer of the suction from instrumentality to another.

44. The combination with a bunch rolling mechanism, of a shaper having a plurality of shaping cavities, a bunch support for transferring the bunches from the rolling mechanism to the shaper, a bunch remover for removing the bunches from the shaper, and means for moving the support independently of the rolling mechanism and between the rolling mechanism and the shaper and the remover from the shaper to a delivery position.

45. The combination with a bunch rolling mechanism, of a shaper having a plurality of shaping cavities, a bunch support for transferring bunches from the rolling mechanism to the shaper, a bunch remover for removing bunches from the shaper, a carriage on which the support and remover are mounted, and means for operating the carriage to move the bunch support from the rolling mechanism to the shaper and the remover from the shaper to a delivery position.

46. The combination with a bunch rolling mechanism, of a shaper having a plurality of shaping cavities, a bunch support for carrying the bunches from the rolling mechanism to the shaper, a bunch remover for removing the bunches from the shaper, a bunch ejector coöperating with the shaper and the remover, and means for operating the support and remover.

47. The combination with a shaper having a plurality of cavities, of a plurality of covers, and coöperative connections for simultaneously removing a cover with a bunch thereon from a shaping cavity.

48. The combination with a traveling shaper having a plurality of shaping cavities, of a plurality of covers, a carriage, and a bunch remover mounted on the carriage, said remover being constructed to support the covers.

49. The combination with a traveling shaper having a plurality of shaping cavities, of a plurality of covers, a bunch remover arranged to support a cover, and an ejector coöperating with the remover whereby a bunch and cover may be simultaneously removed from a cavity.

50. The combination with a traveling shaper having a plurality of cavities, of a bunch support, a bunch remover, an ejector coöperating with the remover, and means for operating the support and remover to bring them successively into operative relation with the shaper.

51. The combination with a bunch rolling mechanism, of a traveling shaper having a plurality of shaping cavities, a bunch support, a bunch remover, a bunch ejector coöperating with the remover, and means for operating the support and remover to cause the remover to remove a bunch from the shaper and the support to transfer a bunch from the rolling mechanism to the shaper.

52. The combination with a bunch rolling mechanism, of a carriage, a traveling shaper having a plurality of shaping cavities, a bunch support and a bunch remover mounted on the carriage, and means for reciprocating the carriage to cause the remover to remove a bunch from the shaper and the support to transfer a bunch from the rolling mechanism to the shaper.

53. The combination with a traveling shaper having a plurality of shaping cavities, of a plurality of covers, means for locking the covers on the shaper, and a remover including cover unlocking mechanism.

54. The combination with a traveling shaper having a plurality of shaping cavities, of a plurality of covers, means for locking the covers on the shaper, a remover including cover unlocking devices, and means for moving the carrier and unlocking devices with respect to the shaper to bring them into an operative position.

55. The combination with a traveling shaper having a plurality of shaping cavities, of a plurality of covers, cover locking devices, a remover, and means operating in connection with the remover for positively engaging and unlocking the covers.

56. The combination with a traveling shaper having a plurality of shaping cavities, of a plurality of covers, cover locking devices, cover unlocking devices arranged to positively engage the covers, and means for operating the unlocking devices to remove the covers from the cavities.

57. The combination with a traveling shaper having a plurality of shaping cavities, of a plurality of covers, a carriage, a bunch support mounted thereon, a remover on the carriage said remover including unlocking devices which positively engage the covers, means for moving the carriage to bring the remover and bunch support successively into position with respect to the shaper, and means for operating the remover and unlocking devices.

58. The combination with a traveling shaper having a plurality of shaping cavities, of a plurality of covers, cover locking devices, a carriage, a bunch support mounted on the carriage, a remover arranged to support the covers and provided with unlocking devices, means for operating the carriage to bring the support and the remover successively into operative position with respect to the shaper, and means for operating the remover and unlocking devices.

59. The combination with a traveling shaper having a plurality of shaping cavities, of a plurality of covers, cover locking devices, a carriage, a bunch support mounted on the carriage, a remover arranged to support the covers and provided with unlocking devices, a bunch ejector, means for operating the carriage to bring the support and the remover successively into operative position with respect to the shaper, and means for operating the remover and unlocking devices.

60. The combination with a traveling shaper comprising a plurality of independent bunch molds said molds being provided with covers, locking devices for the covers, a track for controlling the movement of the molds, and cover unlocking and removing means.

61. The combination with a traveling shaper comprising a plurality of independent bunch molds, of covers for the molds, cover locking devices, means for unlocking and for simultaneously removing a cover and a bunch from a mold.

62. The combination with a traveling shaper comprising a plurality of bunch molds, of covers for the molds, a track for controlling the movement of the molds, and bunch supplying and cover removing devices.

63. The combination with a traveling shaper comprising a plurality of independent bunch molds, of covers for the molds, a track for controlling the movement of the molds, a carriage, bunch supplying and cover removing devices mounted on the carriage, and means for moving the carriage beneath the track.

64. The combination with a traveling shaper comprising a plurality of independent bunch molds, of covers therefor, a track for controlling the movement of the molds, locking devices for the covers, and bunch supplying and removing means, said means including cover unlocking devices.

65. The combination with a traveling shaper comprising a plurality of independent molds, of covers therefor, a track for controlling the movement of the molds, cover locking devices, a carriage, bunch supplying and cover removing means mounted on the carriage, said removing means including cover unlocking devices, and means for moving the carriage with respect to the shaper.

66. The combination with a traveling shaper comprising a plurality of independent bunch molds, of covers therefor, a track for controlling the movement of the molds, locking devices for the covers, unlocking devices, and means for positively engaging and removing the covers.

67. The combination with a traveling shaper comprising a plurality of independent bunch molds, of covers therefor, a track for controlling the movement of the molds, locking devices for the covers, unlocking devices, means for positively engaging and removing the covers, and a bunch ejector cooperating with the removing means.

68. The combination with a traveling shaper having a plurality of shaping cavities, of bunch supplying means, bunch removing means, means for operating the bunch removing means between the shaper and a delivery point, a wrapping mechanism, and means for effecting the transfer of the bunches from the removing means to the wrapping mechanism.

69. The combination with a traveling shaper having a plurality of independent shaping cavities, of means for supplying bunches thereto, bunch removing means, means for operating said removing means between the shaper and the deivery point, a wrapping mechanism, and means for effecting the transfer of the bunches from said delivery point to the wrapping mechanism.

70. The combination with a bunch rolling mechanism, of a traveling shaper having a plurality of independent shaping cavities, means for delivering bunches from the rolling mechanism to the shaper, means for removing the bunches from the shaper and carrying them to a delivery point, a wrapping mechanism, and means for effecting the transfer of the bunches from said delivery mechanism to the wrapping mechanism.

71. The combination with a traveling shaper having a plurality of shaping cavities, of covers for the cavities, means for removing a cover with a bunch thereon from a cavity, and a bunch carrier for taking the bunch from the cover.

72. The combination with a traveling shaper having a plurality of shaping cavities, of covers for the cavities, means for removing a cover with a bunch thereon from a cavity, a bunch carrier for taking the bunch from the cover, and a trimming mechanism for trimming the bunch while in the carrier.

73. The combination with a traveling shaper having a plurality of shaping cavities, of covers for the cavities, and means for removing a cover with a bunch thereon from the shaper and for carrying said bunch and cover to a delivery point.

74. The combination with a traveling shaper having a plurality of independent bunch molds, of a track for controlling the movement of the molds, means for giving the molds an intermittent step-by-step movement, and means for positively locking the molds against movement between the intermittent movements.

75. The combination with a traveling shaper having a plurality of independent cavities, of means for giving the shaper an intermittent step by step movement, means for locking the shaper against movement between the intermittent movements, means for supplying bunches to the shaper, means for inserting bunches into the cavities, and means for locking the inserting means against movement except when in proper delivery position.

76. The combination with a traveling shaper having a plurality of independent shaping cavities, of means for giving the shaper an intermittent step by step movement, means for locking the shaper against movement between the intermittent movements, bunch supplying and bunch removing means, and locking devices cooperating with said means for preventing movement of the bunch supplying and removing means except when in proper position.

77. In a cigar making machine, the combination with bunch forming mechanism, of shaping mechanism, a wrapping mechanism, means for driving said mechanisms simultaneously in timed relation, and means for interrupting the driving connections to enable the shaping and wrapping mechanism to be run independently of the bunch forming mechanism and for restoring the timed relation of said mechanisms when again driven simultaneously.

78. In a cigar making machine, the combination with bunch forming, bunch shaping and wrapping mechanisms, of means for driving said mechanisms in timed relation, and means for interrupting the driving connections to enable the wrapping mechanism to be run independently of the other mechanisms and for restoring the timed relation of said mechanisms when again driven simultaneously.

In testimony whereof we have hereunto set our hands in the presence of two subscribing witnesses.

BERNHARD T. BURCHARDI.
VICTOR E. HANSEN.
HARRY S. MARSH.

Witnesses:
M. M. O'NEILL,
M. L. DEGEN.